(12) United States Patent
Le et al.

(10) Patent No.: US 10,814,320 B2
(45) Date of Patent: Oct. 27, 2020

(54) CAPILLARY TRANSFER PIPETTES AND RELATED METHODS

(71) Applicant: Nalge Nunc International Corporation, Rochester, NY (US)

(72) Inventors: Christopher Le, Oceanside, CA (US); Ilianna Maria Escalante, San Diego, CA (US)

(73) Assignee: Nalge Nunc International Corporation, Rochester, NY (US)

( * ) Notice: Subject to any disclaimer, the term of this patent is extended or adjusted under 35 U.S.C. 154(b) by 0 days.

(21) Appl. No.: 15/231,254

(22) Filed: Aug. 8, 2016

(65) Prior Publication Data

US 2018/0036725 A1 Feb. 8, 2018

(51) Int. Cl.
*B01L 3/00* (2006.01)
*B01L 3/02* (2006.01)
(Continued)

(52) U.S. Cl.
CPC .......... *B01L 3/021* (2013.01); *B29C 49/0073* (2013.01); *B29C 49/04* (2013.01);
(Continued)

(58) Field of Classification Search
CPC ....................................................... B01L 3/00
(Continued)

(56) References Cited

U.S. PATENT DOCUMENTS 2,058,516 A * 10/1936 Schaaff ................. B01L 3/0282
141/24
2,172,575 A * 9/1939 Merville ................. B01L 3/021
222/209
(Continued)

FOREIGN PATENT DOCUMENTS

DE        3016594      * 11/1981

OTHER PUBLICATIONS

SAFE-TEC Clinical Products LLC, Instruction Brochure for Microsafe Tube, retrieved from http://www.safe-tecllc.com/_assets/img/pdfs/microsafe.pdf, dated Aug. 17, 2010 REV I (2 pages).
(Continued)

*Primary Examiner* — Arlen Soderquist
(74) *Attorney, Agent, or Firm* — Wood Herron & Evans LLP

(57) ABSTRACT

A capillary transfer pipette includes a draw tube having a distal end defining a draw tube opening through which liquid is drawn via capillary action, a proximal end, and a lumen. A squeeze bulb is arranged proximally of the draw tube and defines a fluid chamber in fluid communication with the lumen, the squeeze bulb being compressible to dispense drawn liquid from the draw tube. An air vent hole is formed in at least one of the draw tube or the squeeze bulb, and is configured to vent air to facilitate drawing of liquid through the draw tube opening via capillary action. A volume indicating element may be provided on the draw tube, and the air vent hole may be located proximally of the volume indicating element. The lumen may be formed with a first diameter at the proximal end and a differing second diameter at the distal end. Methods of collecting liquid with, and of making, a capillary transfer pipette are also disclosed.

11 Claims, 24 Drawing Sheets

(51) Int. Cl.
*B29C 49/00* (2006.01)
*B29C 49/04* (2006.01)
*B29C 49/50* (2006.01)
*B29K 101/12* (2006.01)
*B29K 105/00* (2006.01)
*B29L 31/00* (2006.01)

(52) U.S. Cl.
CPC ....... *B29C 49/50* (2013.01); *B01L 2200/0684* (2013.01); *B01L 2200/12* (2013.01); *B01L 2300/028* (2013.01); *B01L 2300/0832* (2013.01); *B01L 2300/0838* (2013.01); *B01L 2300/161* (2013.01); *B01L 2400/0406* (2013.01); *B01L 2400/0481* (2013.01); *B29C 2049/047* (2013.01); *B29C 2049/503* (2013.01); *B29K 2101/12* (2013.01); *B29K 2105/258* (2013.01); *B29K 2995/0092* (2013.01); *B29L 2031/753* (2013.01)

(58) Field of Classification Search
USPC .......................................... 422/501; 436/180
See application file for complete search history.

(56) References Cited

U.S. PATENT DOCUMENTS

| | | | | |
|---|---|---|---|---|
| 2,237,213 | A * | 4/1941 | Brown | B01L 3/021 222/420 |
| 2,339,870 | A * | 1/1944 | Waddy | B01L 3/021 222/215 |
| 2,376,231 | A * | 5/1945 | Cohn | B01L 3/021 222/158 |
| 2,410,552 | A * | 11/1946 | Rosen | B01L 3/021 73/864.15 |
| 2,540,360 | A * | 2/1951 | Ulvild | B01L 3/021 222/209 |
| 2,728,232 | A * | 12/1955 | Bremmer | B01L 3/021 422/922 |
| 2,941,869 | A * | 6/1960 | Brown | G01N 33/49 422/401 |
| 2,965,255 | A * | 12/1960 | Gerarde | A61B 5/150022 206/220 |
| 3,045,494 | A * | 7/1962 | Gerarde | G01N 1/38 422/922 |
| 3,219,417 | A * | 11/1965 | Klinbeil | B01L 3/021 422/501 |
| 3,233,785 | A * | 2/1966 | Burke | B01L 3/021 141/26 |
| 3,295,523 | A * | 1/1967 | Weichselbaum | A61J 7/0053 604/217 |
| 3,748,909 | A * | 7/1973 | Kuo | B01L 3/021 73/864.11 |
| 3,783,696 | A * | 1/1974 | Coleman | B01L 3/021 73/864.02 |
| 3,785,366 | A * | 1/1974 | Davis | A61B 10/02 600/562 |
| 3,834,241 | A * | 9/1974 | Garren | B01L 3/021 222/209 |
| 3,838,013 | A * | 9/1974 | Bergeron | B01L 3/021 435/304.1 |
| 3,846,077 | A * | 11/1974 | Ohringer | A61J 1/20 422/534 |
| 3,881,527 | A * | 5/1975 | Shapiro | B01L 3/0282 141/24 |
| 3,910,103 | A * | 10/1975 | Rose | A61B 5/15003 436/69 |
| 3,938,392 | A * | 2/1976 | Rodrigues | B01L 3/021 422/922 |
| 3,952,599 | A * | 4/1976 | Ayres | B01L 3/021 422/922 |
| 4,212,204 | A | 7/1980 | St. Amand | |
| D260,434 | S * | 8/1981 | St. Amand | D24/115 |
| RE31,555 | E * | 4/1984 | Garren | B01L 3/021 222/209 |
| 4,563,104 | A * | 1/1986 | Saint-Amand | B01L 3/021 222/192 |
| 4,589,421 | A * | 5/1986 | Ullman | A61B 5/150022 422/503 |
| 4,779,768 | A | 10/1988 | St. Amand | |
| 5,059,398 | A * | 10/1991 | Kenney | B01L 3/021 222/249 |
| 5,065,768 | A | 11/1991 | Coleman et al. | |
| 5,073,347 | A * | 12/1991 | Garren | B01L 3/021 422/501 |
| 5,110,727 | A * | 5/1992 | Oberhardt | B01F 11/0045 422/110 |
| 5,125,544 | A * | 6/1992 | Millner | B01L 3/0213 141/26 |
| D333,705 | S * | 3/1993 | Garren | D24/222 |
| 5,223,225 | A * | 6/1993 | Gautsch | B01L 3/0275 422/516 |
| 5,240,397 | A * | 8/1993 | Fay | B29C 45/261 264/328.11 |
| 5,456,885 | A | 10/1995 | Coleman et al. | |
| 5,460,782 | A | 10/1995 | Coleman et al. | |
| 5,775,546 | A * | 7/1998 | Buehler | B01L 3/021 222/209 |
| 5,910,122 | A * | 6/1999 | D'Angelo | A61B 10/0051 600/573 |
| RE37,734 | E * | 6/2002 | Buehler | B01L 3/021 222/209 |
| 6,457,612 | B1 * | 10/2002 | Zhang | A61J 1/067 222/107 |
| 6,531,098 | B1 | 3/2003 | Kenney | |
| 6,803,021 | B1 * | 10/2004 | Bertling | B01L 3/022 422/514 |
| 7,344,506 | B2 * | 3/2008 | Scampini | A61B 10/0045 600/569 |
| 8,113,067 | B2 * | 2/2012 | Tanner | B01L 3/021 156/244.13 |
| D694,424 | S * | 11/2013 | Kwak | D24/222 |
| D731,668 | S * | 6/2015 | Kwak | D24/222 |
| D731,669 | S * | 6/2015 | Kwak | D24/222 |
| D731,670 | S * | 6/2015 | Kwak | D24/222 |
| 9,656,258 | B2 * | 5/2017 | Kwak | B01L 3/021 |
| 9,844,777 | B2 * | 12/2017 | Izumo | B01L 3/0275 |
| 2001/0035432 | A1 * | 11/2001 | Buehler | B01L 3/0272 222/206 |
| 2003/0000970 | A1 * | 1/2003 | Pameijer | A61C 3/005 222/207 |
| 2003/0080143 | A1 * | 5/2003 | Kale | B01L 3/0262 222/1 |
| 2007/0031293 | A1 * | 2/2007 | Beatty | A61B 5/150022 422/400 |
| 2008/0292505 | A1 * | 11/2008 | Tian | B01L 3/021 422/400 |
| 2009/0019955 | A1 * | 1/2009 | Mao | B01D 39/1661 73/864.11 |
| 2009/0158861 | A1 * | 6/2009 | Tanner | B01L 3/021 73/864.11 |
| 2011/0129396 | A1 * | 6/2011 | Fish | B01L 3/022 422/507 |
| 2011/0212482 | A1 * | 9/2011 | Jangam | A61B 5/150022 435/29 |
| 2012/0016320 | A1 * | 1/2012 | Lin | A61M 35/003 604/290 |
| 2014/0186235 | A1 * | 7/2014 | Kwak | B01L 3/021 422/520 |
| 2016/0193601 | A1 * | 7/2016 | Magnusson | B01L 3/022 73/864.01 |
| 2016/0313221 | A1 * | 10/2016 | Huschke | G01N 1/14 |
| 2016/0318014 | A1 | 11/2016 | Tubbs et al. | |
| 2017/0036203 | A1 * | 2/2017 | Le | B01L 3/021 |
| 2017/0120238 | A1 | 5/2017 | Bodner | |

(56) References Cited

U.S. PATENT DOCUMENTS

2017/0136453 A1* 5/2017 Izumo .................. B01L 3/0275
2017/0297013 A1* 10/2017 Cohen .................... B01L 3/021

OTHER PUBLICATIONS

Dana DeVange Panteleeff et al., Rapid Method for Screening Dried Blood Samples on Filter Paper for Human Immunodeficiency Virus Type 1 DNA, Journal of Clinical Microbiology, Feb. 1999, p. 350-353, vol. 37, No. 2 (4 pages).

* cited by examiner

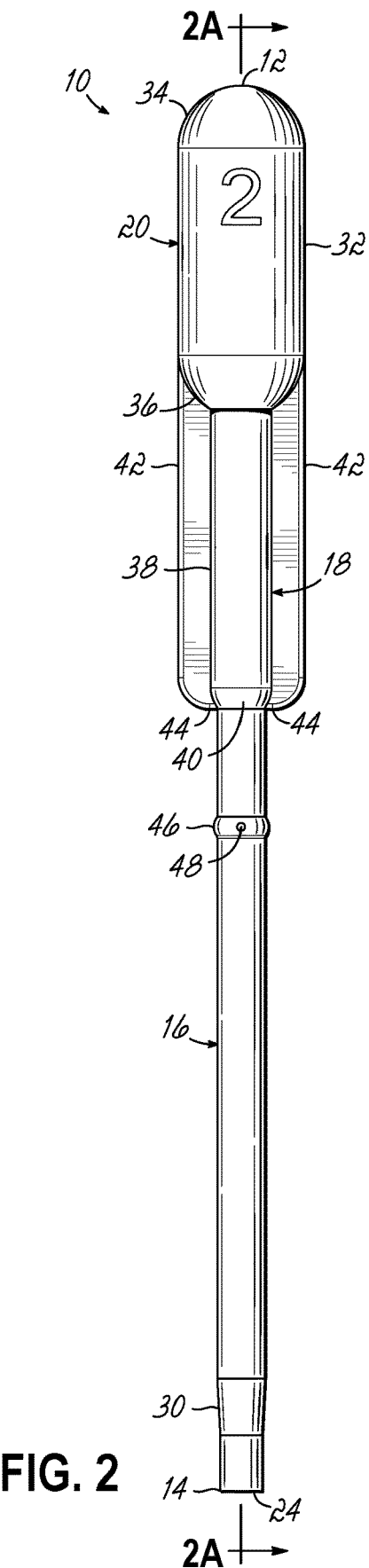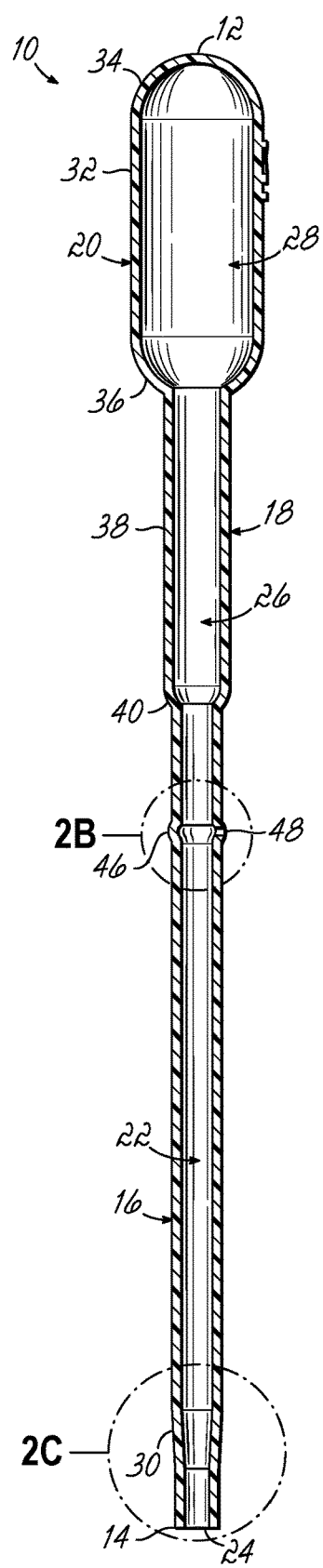
FIG. 2
FIG. 2A

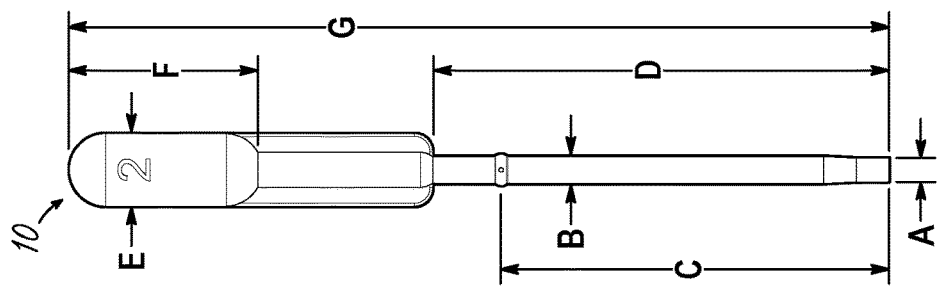

FIG. 4

| VARIOUS DESIGNS | DRAW TUBE VOLUME @ GRAD MARK | DESCRIPTION | DRAW TUBE TIP OD | DRAW TUBE STEM OD | DISTANCE FROM TIP TO GRAD MARK | DRAW TUBE STEM LENGTH | SQUEEZE BULB OD | SQUEEZE BULB LENGTH | PIPETTE OVERALL LENGTH |
|---|---|---|---|---|---|---|---|---|---|
| 71 | 72 | 73 | A 74 | B 75 | C 76 | D 77 | E 78 | F 79 | G 80 |
| | (µL) | | (inches) | (inches) | (inches) | (inches) | (inches) | (inches) | (inches) |
| 1 | 50 | one grad mark | 0.08 | 0.09 | 1.3 | 1.53 | 0.25 | 0.63 | 2.75 |
| 2 | 40 | one grad mark | 0.08 | 0.09 | 1.3 | 1.53 | 0.25 | 0.63 | 2.75 |
| 3 | 60 | one grad mark | 0.08 | 0.09 | 1.53 | 1.76 | 0.25 | 0.63 | 2.98 |
| 4 | 75 | one grad mark | 0.08 | 0.09 | 1.8 | 2.03 | 0.25 | 0.63 | 3.25 |
| 5 | 100 | one grad mark | 0.08 | 0.09 | 2.38 | 2.61 | 0.25 | 0.63 | 3.83 |
| 6 | 50, 75, 100 | 3 grad marks | 0.08 | 0.09 | 1.3, 1.8, 2.38 | 2.61 | 0.25 | 0.63 | 3.83 |
| 7 | 150 | one grad mark | 0.08 | 0.122 | 1.73 | 1.96 | 0.31 | 0.64 | 3.41 |
| 8 | 175 | one grad mark | 0.08 | 0.122 | 1.98 | 2.21 | 0.31 | 0.64 | 3.43 |
| 9 | 200 | one grad mark | 0.08 | 0.122 | 2.23 | 2.46 | 0.31 | 0.64 | 3.68 |
| 10 | 150, 175, 200 | 3 grad marks | 0.08 | 0.122 | 1.73, 1.98, 2.23 | 2.46 | 0.31 | 0.64 | 3.68 |

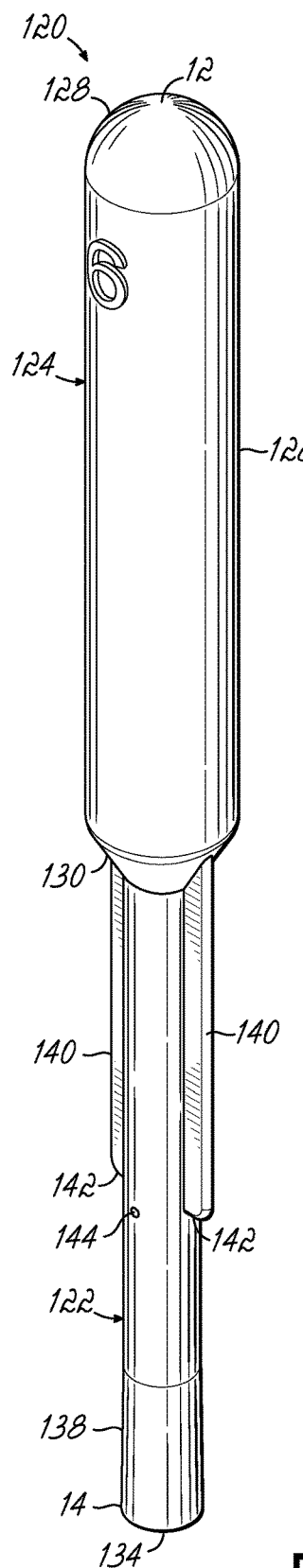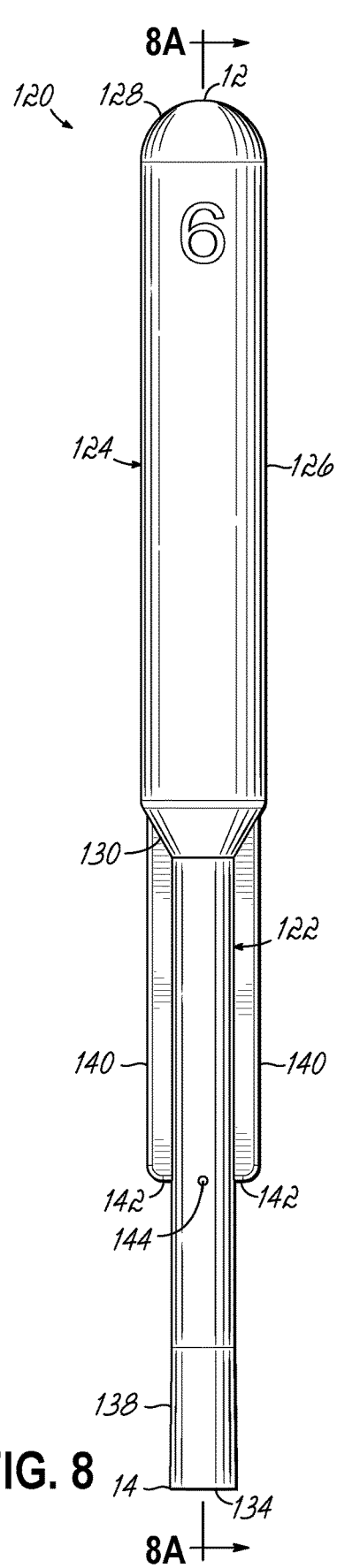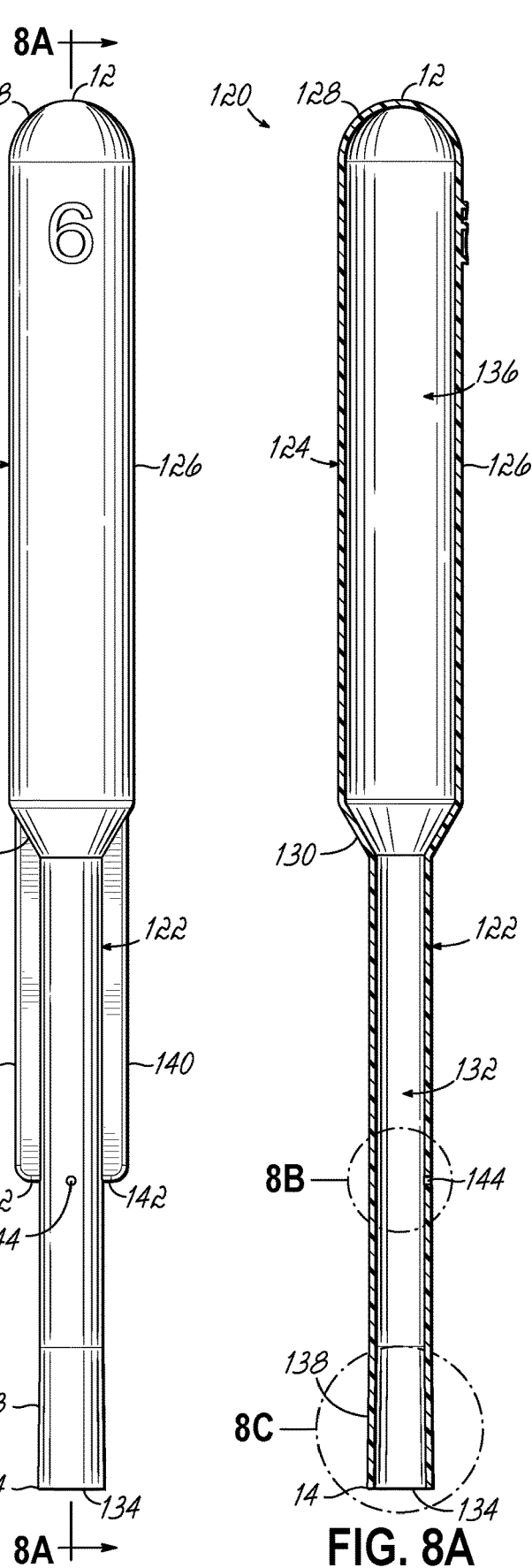

CAPILLARY TRANSFER PIPETTES AND RELATED METHODS

TECHNICAL FIELD

The present invention relates generally to material transfer devices and, more particularly, to capillary pipettes.

BACKGROUND

Capillary pipettes are widely used for collecting and dispensing liquids in medical applications, such as blood in "finger-prick" procedures. Conventional capillary pipettes include a draw tube having a draw tube opening formed with diameter sufficiently small to draw liquid into the draw tube via capillary action. Traditionally, such capillary pipettes are formed with a rigid construction from a material such as glass. Accordingly, dispensing of liquid from the draw tube traditionally requires use of an accessory device, such as a plunger, squeeze bulb, or piston, coupled to the draw tube.

Attempts have been made to produce capillary pipettes from elastically deformable materials so as to include an integrally formed squeeze bulb that is compressible to dispense drawn liquid from the draw tube. However, such capillary pipettes and their related methods of manufacture present various shortcomings. For example, such pipettes are formed through generally inefficient manufacturing processes that include a multitude of manufacturing steps, such as crimping. Further, the features of such capillary pipettes fail to enable adequately efficient use of the pipettes. Accordingly, there is a need for improvements to known capillary pipettes and related methods of manufacture and use to address these and other shortcomings.

SUMMARY

A capillary transfer pipette according to an exemplary embodiment of the invention includes a draw tube having a distal end defining a draw tube opening through which liquid is drawn via capillary action, a proximal end, and a lumen extending therebetween. A squeeze bulb is arranged proximally of the draw tube and defines a fluid chamber in fluid communication with the lumen, the squeeze bulb being compressible to dispense drawn liquid from the draw tube. An air vent hole is formed in at least one of the draw tube or the squeeze bulb, and is configured to vent air therethrough to facilitate drawing of liquid through the draw tube opening via capillary action. At least volume indicating element is provided on the draw tube.

A capillary transfer pipette according to another exemplary embodiment of the invention includes a draw tube having a distal end defining a draw tube opening through which liquid is drawn via capillary action, a proximal end, and a lumen extending therebetween. The lumen is formed with a first diameter at the proximal end and a differing second diameter at the distal end. A squeeze bulb is arranged proximally of the draw tube and defines a fluid chamber in fluid communication with the lumen, the squeeze bulb being compressible to dispense drawn liquid from the draw tube. An air vent hole is formed in at least one of the draw tube or the squeeze bulb and is configured to vent air therethrough to facilitate drawing of liquid through the draw tube opening via capillary action.

A capillary transfer pipette according to another exemplary embodiment of the invention includes a draw tube having a distal end defining a draw tube opening through which liquid is drawn via capillary action, a proximal end, and a lumen extending therebetween. A squeeze bulb is arranged proximally of the draw tube and defines a fluid chamber in fluid communication with the lumen, the squeeze bulb being compressible to dispense drawn liquid from the draw tube. At least one volume indicating element is provided on the draw tube, and an air vent hole is formed proximally of the at least one volume indicating element and is configured to vent air therethrough to facilitate drawing of liquid through the draw tube opening via capillary action.

A method of collecting liquid, according to an exemplary embodiment of the invention, with a capillary transfer pipette having a draw tube and an air vent hole includes positioning a distal opening of the draw tube in contact with a liquid to be drawn via capillary action, and drawing the liquid into the draw tube via capillary action. The method further includes selectively obstructing the air vent hole when a proximal surface of the drawn liquid reaches one of a plurality of volume indicating elements provided on the draw tube, so as to cease drawing of the liquid into the draw tube.

A method of making a capillary transfer pipette according to an exemplary embodiment of the invention includes extruding a parison of molten polymeric material, and positioning the parison within a mold cavity defined between first and second mold structures and having a cavity wall. The method further includes injecting air into the parison so that the parison expands within the mold cavity and conforms to the cavity wall to form a capillary transfer pipette. The mold cavity is shaped so as to provide the capillary transfer pipette with a draw tube configured to draw liquid via capillary action, a squeeze bulb arranged proximally of the draw tube and configured to be compressed to dispense drawn liquid from the draw tube, and at least one fin extending longitudinally. The method further includes forming an air vent hole in at least one of the draw tube or the squeeze bulb, the air vent hole configured to vent air therethrough to facilitate drawing of liquid by the draw tube via capillary action.

Various additional features and advantages of the invention will become more apparent to those of ordinary skill in the art upon review of the following detailed description of exemplary embodiments taken in conjunction with the accompanying drawings. The drawings, which are incorporated in and constitute a part of this specification, illustrate exemplary embodiments of the invention and, together with the general description given above and the detailed description given below, serve to explain the exemplary embodiments.

BRIEF DESCRIPTION OF THE DRAWINGS

Like reference numerals are used to indicate like features throughout the various figures, wherein:

FIG. 2 is a front elevation view of the capillary transfer pipette of FIG. 1.

FIG. 2A is a side cross-sectional view of the capillary transfer pipette of FIG. 2, taken along line 2A-2A.

FIG. 4 is a table displaying characteristics of capillary transfer pipettes according to various exemplary embodiments of the invention.

FIG. 7 is a front perspective view of a capillary transfer pipette according to another exemplary embodiment.

FIG. 8 is a front elevation view of the capillary transfer pipette of FIG. 7.

FIG. 8A is a side cross-sectional view of the capillary transfer pipette of FIG. 8, taken along line 8A-8A.

DETAILED DESCRIPTION

Figure 1:
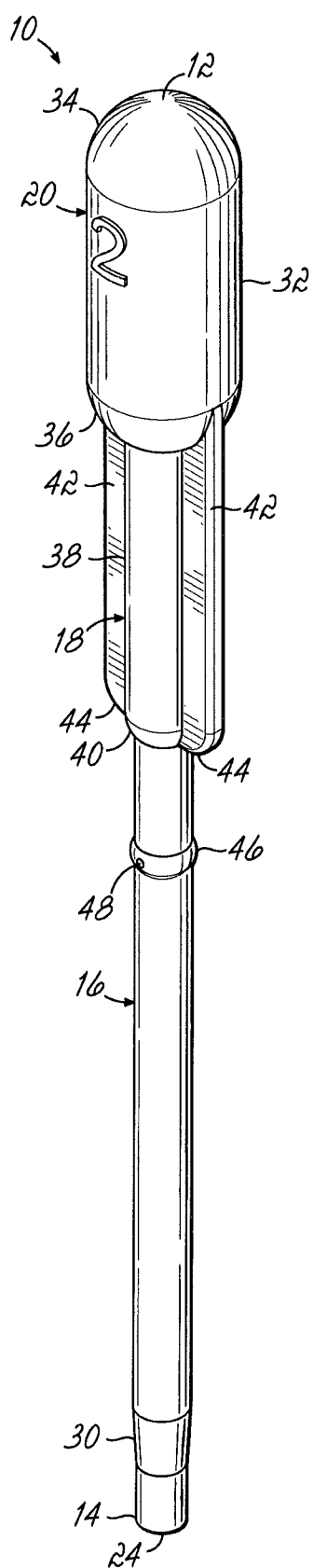
FIG. 1 is a front perspective view of a capillary transfer pipette according to an exemplary embodiment of the invention.
Figure 2B:
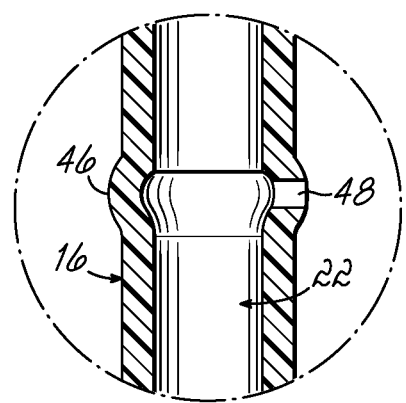
FIG. 2B is an enlarged cross-sectional view of a region of the capillary transfer pipette indicated in FIG. 2A.
Figure 2C:
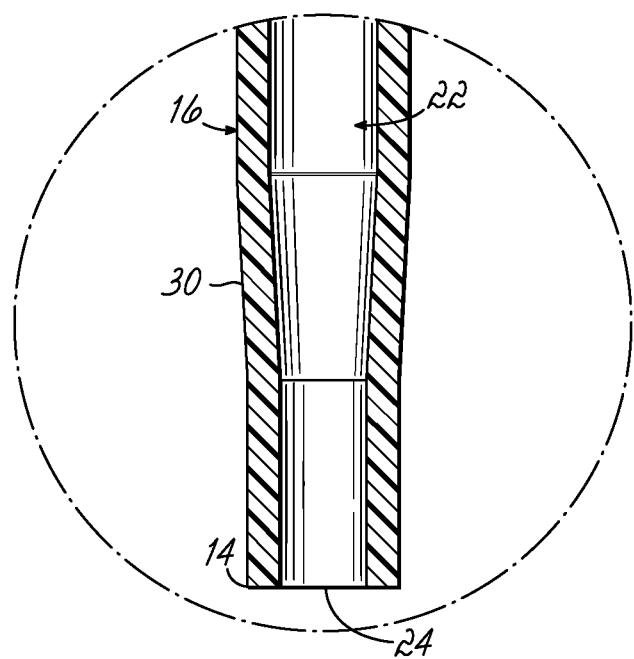
FIG. 2C is an enlarged cross-sectional view of a region of the capillary transfer pipette indicated in FIG. 2A.

Referring to FIGS. 1 and 2-2C, a capillary transfer pipette 10 according to an exemplary embodiment of the invention is shown. The capillary pipette 10 is an integrally formed, unitary structure having a proximal end 12 and a distal end 14. The capillary pipette 10 includes a draw tube 16, a connecting tube 18 extending proximally from a proximal end of the draw tube 16, and a squeeze bulb 20 extending proximally from a proximal end of the connecting tube 18.

As shown best in FIG. 2A, a lumen 22 extends longitudinally through the draw tube 16 between a draw tube opening 24 formed at a distal end of the draw tube 16, and a first air chamber 26 defined by the connecting tube 18. A second air chamber 28 defined by the squeeze bulb 20 fluidly communicates with the lumen 22 via the first air chamber 26. The draw tube opening 24 and the lumen 22 are each formed with a sufficiently small diameter so as to draw a volume of liquid into the lumen 22 via capillary action when the distal end 14 of the draw tube 16 is positioned in contact with a pool of liquid. As described below, the squeeze bulb 20 is compressible, and elastically deformable, for dispensing select amounts of the drawn liquid from the draw tube 16. Accordingly, the squeeze bulb 20 functions as a dispense bulb. The exemplary embodiments of the invention disclosed herein are particularly useful for drawing and dispensing very small volumes of liquid, such as blood, on the order of microliters (μL), for example, as described below.

Still referring to FIG. 2A, the draw tube lumen 22 may be formed with a first diameter at its proximal end where the lumen 22 opens to the connecting tube air chamber 26, and with a differing second diameter at its distal end where the lumen 22 opens to the draw tube opening 24. More specifically, as best seen in FIG. 2C, the draw tube 16 may include a tapered distal end portion 30 proximate to the draw tube opening 24, through which the lumen 22 tapers radially inward in a direction toward the draw tube opening 24. Accordingly, the lumen 22 is provided with a first diameter at its proximal end, and a smaller second diameter at its distal end.

Returning to FIG. 1, the squeeze bulb 20 includes an elongate tubular portion 32, a proximal domed portion 34 that defines a closed end of the capillary transfer pipette 10, and a distal rounded tapered portion 36 connecting to a proximal end of the connecting tube 18. The connecting tube 18 includes an elongate tubular portion 38 extending distally from the squeeze bulb 20, and a distal rounded tapered portion 40 connecting to a proximal end of the draw tube 16. Though not shown, the capillary pipette 10 may include a tab-like fin that projects proximally from the proximal domed portion 24 of the squeeze bulb 20. Similar to the side fins 42 described below, the proximal end fin would facilitate user handling and provide an additional surface on which visual indicia could be arranged for labeling purposes.

As used herein, the term "tubular" is not limited to structures having circular cross-sectional shapes. In that regard, while the squeeze bulb 20, the connecting tube 18, and the draw tube 16 are each shown having circular transverse cross-sections, in alternative embodiments these components may be formed with transverse cross-sections of various alternative shapes, such as oval or other non-circular shapes, for example. Moreover, while the squeeze bulb 20, the connecting tube 18, and the draw tube 16 are shown arranged in a substantially linear configuration along a common longitudinal axis, it will be appreciated that various alternative configurations of these components may also be employed.

A pair of longitudinally extending fins 42 may be provided on the capillary transfer pipette 10 to facilitate handling of the pipette 10 by a user, and also to enhance overall structural rigidity of the pipette 10. In the exemplary embodiment of FIG. 1, the fins 42 project radially outward from the connecting tube 18 at diametrically opposed positions, and extend longitudinally from a distal end of the connecting tube 18 to a distal end of the squeeze bulb 20, where the fins 42 couple to the distal rounded tapered portion 36 of the squeeze bulb 20. Advantageously, distal ends 44 of the fins 42 may be spaced proximally from the draw tube opening 24 so as to prevent unintended attraction of excess liquid onto the fins 42 during drawing of liquid into the draw tube 16. Such attraction of excess liquid onto the fins 42 could undesirably distort the volumetric accuracy of a liquid sample transferred from the capillary pipette 10 to a secondary medium. In the embodiment of FIG. 1, the distal ends 44 of the fins 42 are also located so as to not extend distally beyond an air vent hole 48, described below. In alternative embodiments, the fins 42 may extend for various other lengths along the capillary pipette 10 as desired, for example as described below.

Each of the fins 42 may be formed with a generally planar construction, and with a radial dimension so as to not project radially beyond a maximum outer periphery of the squeeze bulb 20, defined by the tubular portion 32. For example, as shown, radially outer edges of the fins 42 may be generally flush with the tubular portion 32. In alternative embodiments, the fins 42 may be formed with various alternative constructions and at various alternative locations along the pipette 10. Additionally, though not shown, planar surfaces of the fins 42 may be provided with visual indicia for identifying the internal contents and/or a capillary draw volume of the capillary pipette 10, for example.

One or more volume indicating elements, or "graduation mark," may be arranged on the draw tube 16 to provide a user with a visual reference for determining a volume of liquid contained within the draw tube 16. In the embodiment of FIG. 1, a volume indicating element is in the form of an annular rib 46 formed integrally within a sidewall of the draw tube 16 and projecting radially outward. In alternative embodiments, various other forms of volume indicating elements may be provided, such as protrusions or printed indicia including rings, notches, numbers, letters, symbols, or other markings, for example. Moreover, it will be appreciated that volume indicating elements may be omitted from the draw tube 16, if desired. As described below in connection with FIG. 1A, a plurality of volume indicating elements may be provided on the draw tube 16.

As best shown in FIGS. 2 and 2B, the capillary transfer pipette 10 includes an air vent hole 48 that extends radially through a sidewall of the pipette 10 and communicates with the lumen 22. In this embodiment, the air vent hole 48 extends through the volume indicating rib 46 formed in the sidewall of the draw tube 16, and opens directly to the lumen 22. As shown and described below in connection with FIGS. 3 and 3A, air from the lumen 22 is vented outwardly through the air vent hole 48 to the external environment as liquid is drawn proximally through the draw tube opening 24 into the lumen 22. In embodiments in which the air vent hole 48 is arranged on the draw tube 16, capillary action drawing of liquid into the lumen 22 stops automatically when a proximal surface of the drawn liquid reaches the air vent hole 48. Drawing of liquid may be stopped before this point by selectively obstructing the air vent hole 48 so as to block air passage therethrough.

A maximum volume of liquid drawable by the capillary transfer pipette 10 via capillary action, or "maximum capillary draw volume," is equal to the internal volume of the portion of the draw tube 16 capable of receiving liquid during a capillary draw. In embodiments in which the air vent hole 48 is arranged on the draw tube 16, as shown on capillary pipette 10 in FIG. 2, a proximal surface of the capillary drawn liquid automatically stops at the air vent hole 48, as described above. Accordingly, the portion of the draw tube 16 capable of receiving liquid during a capillary draw is the portion located between the air vent hole 48 and the draw tube opening 24. In other words, when the air vent hole 48 is located on the draw tube 16, the maximum capillary draw volume is defined by a longitudinal spacing of the air vent hole 48 proximally from the draw tube opening 24, in addition to the internal geometry of the lumen 22 into which the liquid is drawn. Generally, the maximum capillary draw volume increases as the positioning of the air vent hole 48 advances proximally along the draw tube 16. In exemplary embodiments, the draw tube 16 and the lumen 22 may be suitably sized, and the air vent hole 48 may be suitably located, to define a maximum capillary draw volume ranging from approximately 20 µL to approximately 200 µL, for example.

In other embodiments in which the air vent hole 48 is located proximally of the draw tube 16, for example on the squeeze bulb 20 as shown on the capillary pipette 50 of FIG. 1A, described below, the maximum capillary draw volume is equal to the full internal volume of the lumen 22 extending through the draw tube 16.

As shown in FIG. 1 and described above, the air vent hole 48 may be positioned in alignment with and extend through the volume indicating rib 46. With this configuration, the volume indicating rib 46 through which the air vent hole 48 extends indicates the maximum capillary draw volume of the capillary pipette 10. Advantageously, particularly in embodiments in which the capillary pipette 10 is formed of a translucent material, a user knows upon quick visual inspection of the capillary pipette 10 that the maximum capillary draw volume of the pipette 10 has approximately been attained when a proximal surface of liquid drawn into the draw tube 16 advances proximally to and reaches the volume indicating rib 46 having the air vent hole 48.

Figure 1A:
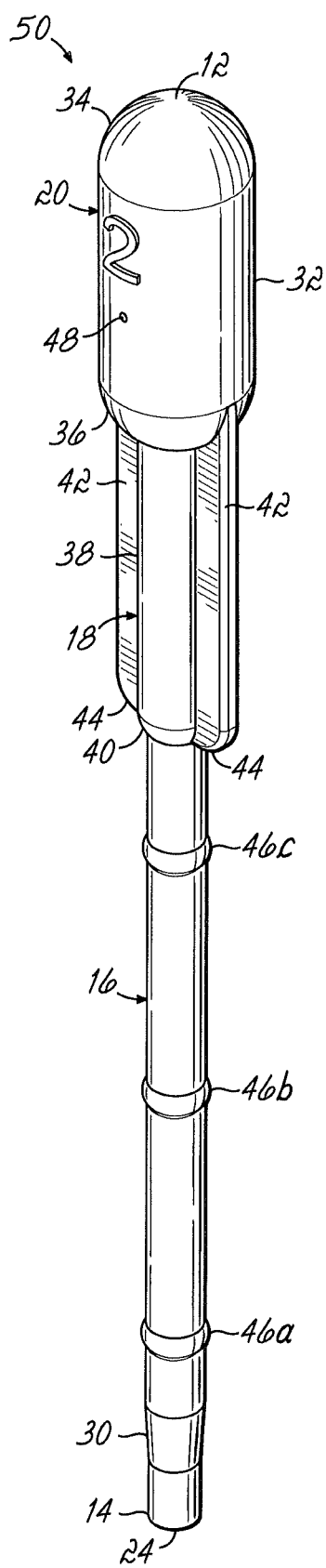
FIG. 1A is a front perspective view of a capillary transfer pipette according to another exemplary embodiment.
Figure 1B:
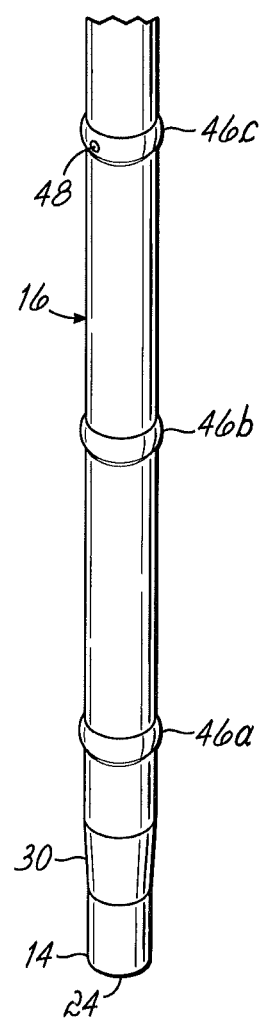
FIG. 1B is a partial front perspective view of a capillary transfer pipette according to yet another exemplary embodiment.

Referring to FIG. 1A, showing a capillary transfer pipette 50 according to an exemplary alternative embodiment, the draw tube 16 may be provided with a plurality of volume indicating elements, shown in the form of first, second, and third volume indicating ribs 46a, 46b, 46c, spaced apart along the draw tube 16. Additionally, the air vent hole 48 may be located proximally of the proximal-most volume indicating rib 46c. For example, as shown, the air vent hole 48 may be located in the tubular portion 32 of the squeeze bulb 20. In alternative embodiments, the air vent hole 48 may be located at any suitable location proximal of the proximal-most volume indicating rib 46c, for example in the tubular portion 38 of the connecting tube 18. In another embodiment, the air vent hole 48 may be located in alignment with and extend through the proximal-most volume indicating rib 46c, for example, as shown in FIG. 1B, with the air vent hole 48 provided in the tubular portion 32 of the squeeze bulb 20 being removed.

The volume indicating ribs 46a, 46b, 46c may be spaced proximally from the draw tube opening 24 as desired on the draw tube 16 to indicate respective, predetermined capillary draw volumes. In an exemplary embodiment, the distal-most first volume indicating rib 46a may be located to indicate a first capillary draw volume of 50 µL, the second volume indicating rib 46b may be located to indicate a second capillary draw volume of 75 µL, and the proximal-most third volume indicating rib 46c may be located to indicate a third capillary draw volume of 100 µL. As described below in connection with FIGS. 3 and 3A, the air vent hole 48 may be selectively obstructed to draw a desired volume of liquid into the draw tube 16 via capillary action, for example a volume corresponding to a selected one of the volume indicating ribs 46a, 46b, 46c.

Still referring to FIG. 1A, the proximal-most third volume indicating rib 46c may be spaced distally from a proximal end of the draw tube 16 (i.e., distally from the connecting tube 18). As such, and because the air vent hole 48 is arranged proximally of the proximal-most volume indicating rib 46c, capillary action may draw liquid into the lumen 22 proximally beyond the proximal-most rib 46c, if desired. Further, in an alternative embodiment, the connecting tube 18 may be omitted from the capillary pipette 10 so that the draw tube 16 extends all the way to and connects with the squeeze bulb 20, thereby permitting drawn liquid to advance proximally to a distal end of the squeeze bulb 20.

The capillary transfer pipettes 10, 50 described above, as well as capillary pipettes according to other exemplary embodiments described below, may be formed from various polymeric materials and may exhibit a hydrophilic characteristic. In exemplary embodiments, the pipettes 10, 50 may be formed from a polymeric material that is inherently hydrophilic, such as acrylonitrile resins, polyether block polyamides, cellulose acetate propionate, cellulose acetate butyrate, polyether polyurethane, or nylons, for example. In other embodiments, the pipettes 10, 50 may be formed from a hydrophobic polymeric material mixed with a hydrophilic additive. Exemplary hydrophobic materials may include low density polyethylene (LDPE), polypropylene copolymer, linear low density polyethylene, polyethylene terephthalate, polybutylene terephthalate, perfluoroalkoxy, or fluorinated ethylene propylene, for example. Additionally, exemplary hydrophilic additives may include polyethylene glycol, polyethylene oxide, or polypropylene oxide, for example. In one embodiment, the capillary pipette 10 may be formed from LDPE mixed with hydrophilic additive "PM111094" made available by Techmer PM of Rancho Dominguez, Calif. As described in greater detail below in connection with FIGS. 17-19C, the exemplary capillary pipettes disclosed herein, including pipettes 10 and 50, may be formed through extrusion blow molding.

Figure 3:
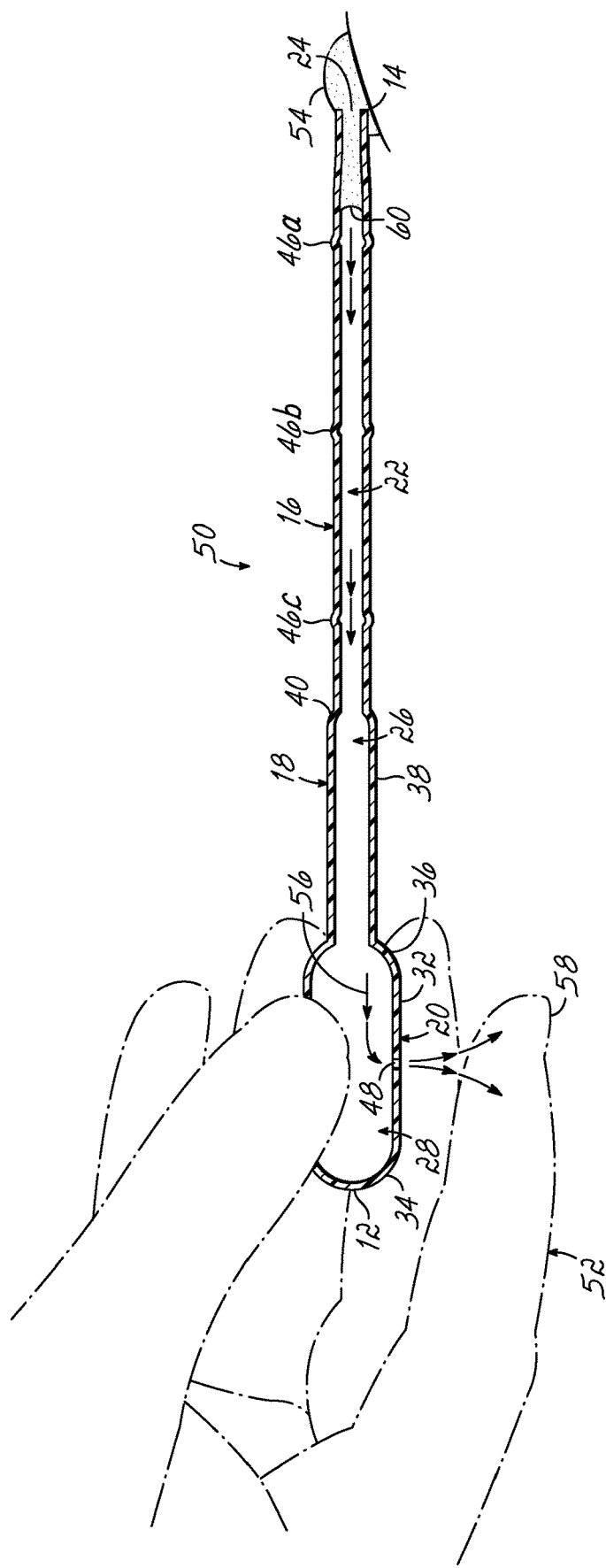
FIG. 3 is a schematic side cross-sectional view of the capillary transfer pipette of FIG. 1A, showing drawing of liquid into a draw tube via capillary action.
Figure 3A:
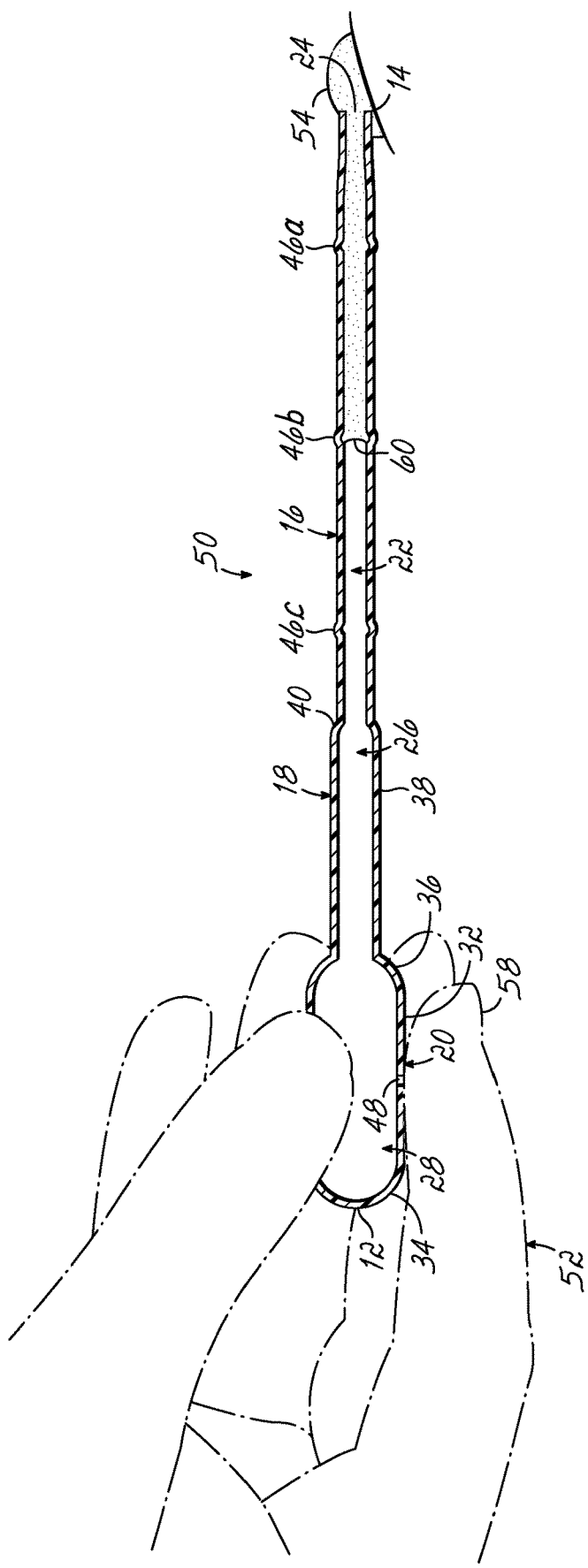
FIG. 3A is a schematic side cross-sectional view similar to FIG. 3, showing obstruction of an air vent hole formed in the capillary transfer pipette to cease drawing of liquid.
Figure 3B:
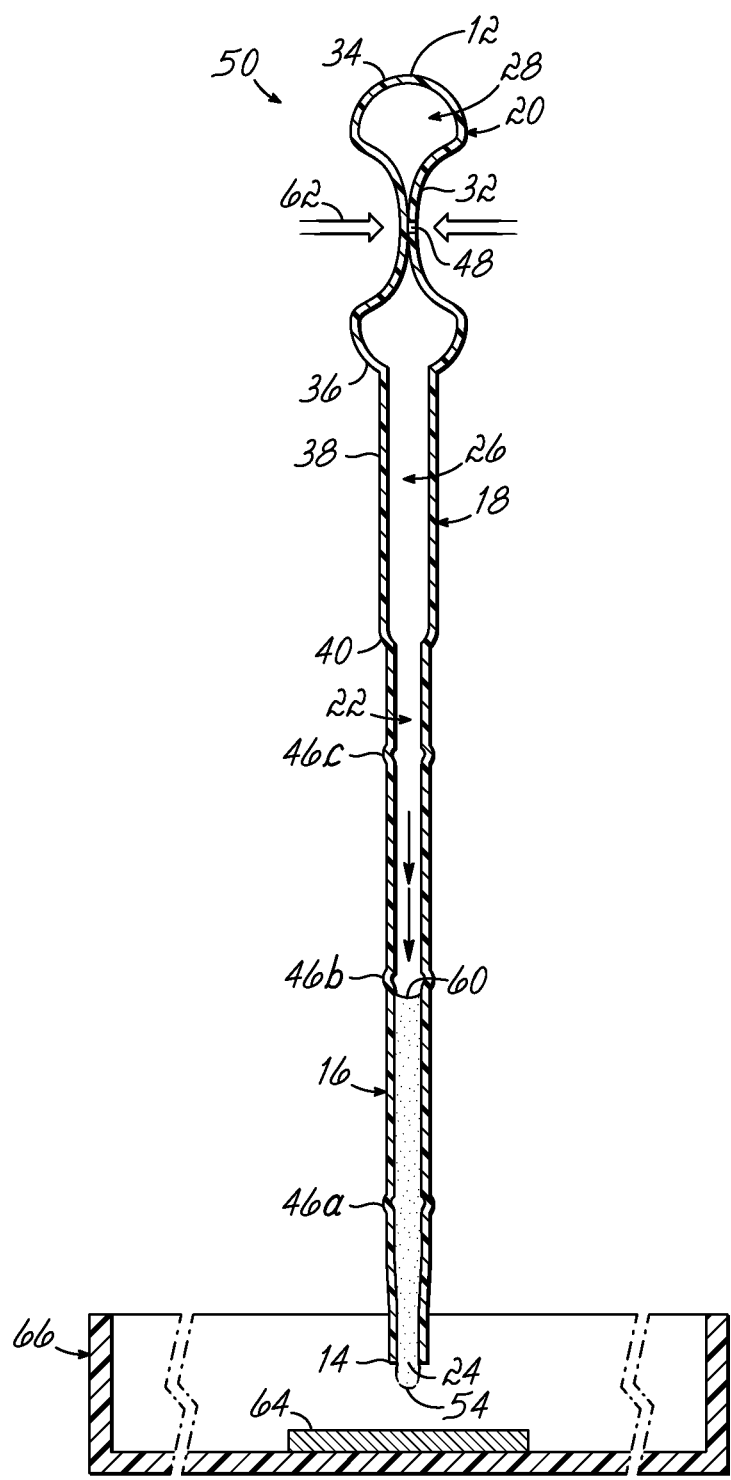
FIG. 3B is schematic a side cross-sectional view similar to FIG. 3A, showing compression of a squeeze bulb to dispense liquid from the draw tube.

Referring to FIGS. 3-3B, an exemplary method of transferring liquid using capillary transfer pipette 50 of FIG. 1A is now described. As shown in FIG. 3, the capillary pipette 50 is gripped and supported by the hand 52 of a user so that the draw tube opening 24 is positioned in contact with a pool of liquid 54. While the capillary pipette 50 is shown supported in a generally horizontal orientation, it will be appreciated that the capillary pipette 50 alternatively may be supported in a more vertically angled orientation as desired to facilitate liquid draw.

Prior to drawing liquid into the capillary pipette 50, an internal air pressure within the pipette 50 is equalized with an external ambient air pressure. Upon positioning the draw tube opening 24 in contact with the liquid 54, the liquid 54 is attracted into the lumen 22 via capillary action, which increases the internal air pressure. As shown in FIG. 3, drawing of liquid 54 into the draw tube 16 via capillary action is enabled by ensuring that the air vent hole 48, shown located in the squeeze bulb 20, is unobstructed so as to permit venting of air therethrough. While the air vent hole 48 remains unobstructed, air from within the lumen 22 and the first and second air chambers 26, 28 is vented outwardly through the air vent hole 48 to the external environment, as indicated by air flow arrows 56, thereby relieving the internal air pressure within the pipette 50. Accordingly, while the air vent hole 48 remains unobstructed, liquid 54 will continue to be drawn proximally into the draw tube 16.

As shown in FIG. 3A, drawing of liquid 54 into the draw tube 16 may be stopped by selectively obstructing the air vent hole 48, for example with a finger 58 of the user, to block air from venting therethrough. The user may elect to block the air vent hole 48 to stop liquid draw when a proximal surface 60 of the drawn liquid 54 advances proximally to any desired location along the draw tube 16, such as any one of the volume indicating ribs 46a, 46b, 46c. As described above, each of the volume indicating ribs 46a, 46b, 46c corresponds to a predetermined capillary draw volume. Accordingly, by monitoring proximal advancement of the upper liquid surface 60 within the draw tube 16 and timely blocking the air vent hole 48, the user may precisely draw a selected volume of liquid 54 into the capillary pipette 50. In the exemplary embodiment of FIG. 3B, the upper liquid surface 60 is shown having advanced to the second volume indicating rib 46b.

As shown in FIG. 3B, drawn liquid 54 is dispensed from the draw tube 16 by compressing the squeeze bulb 20, as indicated by compression arrows 62. The squeeze bulb 20 is shown in a fully compressed state in which opposed sidewalls of the squeeze bulb 20 substantially contact one another, thereby evacuating air from the squeeze bulb 20 in a distal direction. More specifically, compression of the squeeze bulb 20 forces air residing within the first and second air chambers 26, 28 distally, which in turn forces drawn liquid 54 distally outward through the draw tube opening 24. While the squeeze bulb 20 is shown in a fully compressed state for dispensing all liquid 54 from the draw tube 16, it will be appreciated that the squeeze bulb 20 may be partially compressed as desired to dispense only a select portion of the liquid 54 held within the draw tube 16. After dispensing the liquid 54 from the capillary pipette 50, the squeeze bulb 20 is released from its compressed state and is allowed to expand radially outward to return to its relaxed state.

Liquid held within the capillary pipette 50 may be dispensed onto any desired medium. In the exemplary embodiment of FIG. 3B, the capillary pipette 50 is shown transferring liquid 54 to an absorbent medium 64 contained within a sample holding container 66, shown in the form of a Petri-dish. The medium 64 may function to absorb the liquid 54 for later analysis.

In an exemplary blood screening application, the absorbent medium 64 may be in the form of a paper blood test card (not shown), such as those commonly known in the art, rather than a piece of filter paper. The card may be handled without use of a container 66. A face of the card may include indicia defining a plurality of segregated test regions for receiving a respective plurality of blood droplets. In one embodiment, each of the test regions may be pre-impregnated with a respective reactant configured to react with the respective blood droplet to indicate presence or absence of a particular characteristic of the blood droplet.

Referring to FIG. 4, a table 70 displaying characteristics of capillary transfer pipettes according to various exemplary embodiments of the invention is shown. Provided alongside the table 70 is a schematic representation of capillary pipette 10 of FIG. 1, shown with dimensional reference characters A-G corresponding to dimensional characteristics listed in columns 71-80 of table 70. It will be understood that capillary pipette 10 is shown for illustrative purposes only, and that the characteristics set forth in table 70 may be applied to any of the exemplary capillary transfer pipettes shown and described herein.

First column 71 of the table 70 enumerates exemplary Pipettes 1-10. As described below, each of the remaining columns 72-80 of table 70 provides information corresponding to a respective pipette characteristic, for each of the Pipettes 1-10.

Second column 72 of table 70 indicates one or more capillary draw volumes for each of the Pipettes 1-10, as indicated by one or more volume indicating elements provided on the Pipette 1-10. As described above, a capillary draw volume corresponds to an internal volume of the draw tube lumen measured at a location proximal of the draw tube opening. Where multiple capillary draw volumes are listed (i.e., for Pipettes 6 and 10), the smallest capillary draw volume corresponds to a distal-most volume indicating element (e.g., volume indicating rib 46a of capillary pipette 50), and the largest capillary draw volume corresponds to a proximal-most volume indicating element (e.g., volume indicating rib 46c of capillary pipette 50). Column 72 shows an exemplary maximum capillary draw volume of 200 μL and an exemplary minimum capillary draw volume of 40 μL. In other embodiments of the invention, capillary draw volumes may range from approximately 20 μL to more than 200 μL, for example.

Third column 73 of table 70 provides for each Pipette 1-10 a brief description identifying the quantity of volume indicating elements, or "grad marks," formed on the Pipette 1-10.

Fourth column 74 of table 70 indicates for each Pipette 1-10 an outer diameter of the draw tube at its distal end, or "tip," and corresponds to dimensional reference character A shown in the schematic representation of capillary pipette 10.

Fifth column 75 of table 70 indicates for each Pipette 1-10 an outer diameter of the draw tube, or "stem," and corresponds to dimensional reference character B shown in the schematic representation of capillary pipette 10.

Sixth column 76 of table 70 indicates for each Pipette 1-10 a distance from the draw tube distal end, or "tip," and the one or more volume indicating elements provided on the draw tube, and corresponds to dimensional reference character C shown in the schematic representation of capillary pipette 10. Where multiple distances are listed (i.e., for Pipettes 6 and 10), the smallest distance corresponds to the distal-most volume indicating element, and the largest distance corresponds to the proximal-most volume indicating element.

Seventh column 77 of table 70 indicates for each Pipette 1-10 a length of the draw tube, or "stem," and corresponds to dimensional reference character D shown in the schematic representation of capillary pipette 10.

Eighth column 78 of table 70 indicates for each Pipette 1-10 a maximum outer diameter of the squeeze bulb, and corresponds to dimensional reference character E shown in the schematic representation of capillary pipette 10.

Ninth column 79 of table 70 indicates for each Pipette 1-10 a length of the squeeze bulb, and corresponds to dimensional reference character F shown in the schematic representation of capillary pipette 10.

Tenth column 80 of table 70 indicates for each Pipette 1-10 an overall length of the Pipette 1-10, and corresponds to dimensional reference character G shown in the schematic representation of capillary pipette 10.

Turning to FIGS. 5-16C, capillary transfer pipettes according to various additional exemplary embodiments of the invention are shown, for which like reference numerals refer to like features of transfer pipette 10, 50 of FIGS. 1 and 1A. While the capillary pipettes differ structurally from the capillary pipettes 10, 50 described above, they function in a substantially similar manner, unless otherwise described.

Figure 5:
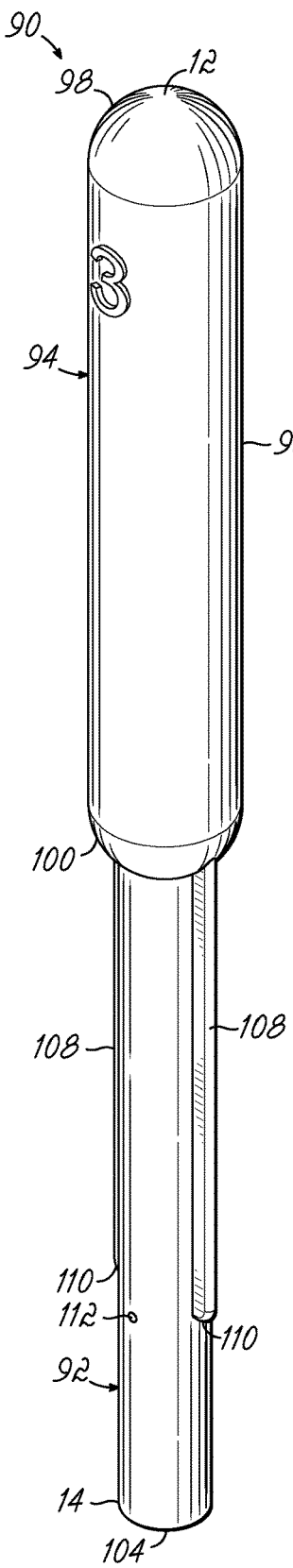
FIG. 5 is a front perspective view of a capillary transfer pipette according to another exemplary embodiment.
Figure 6:
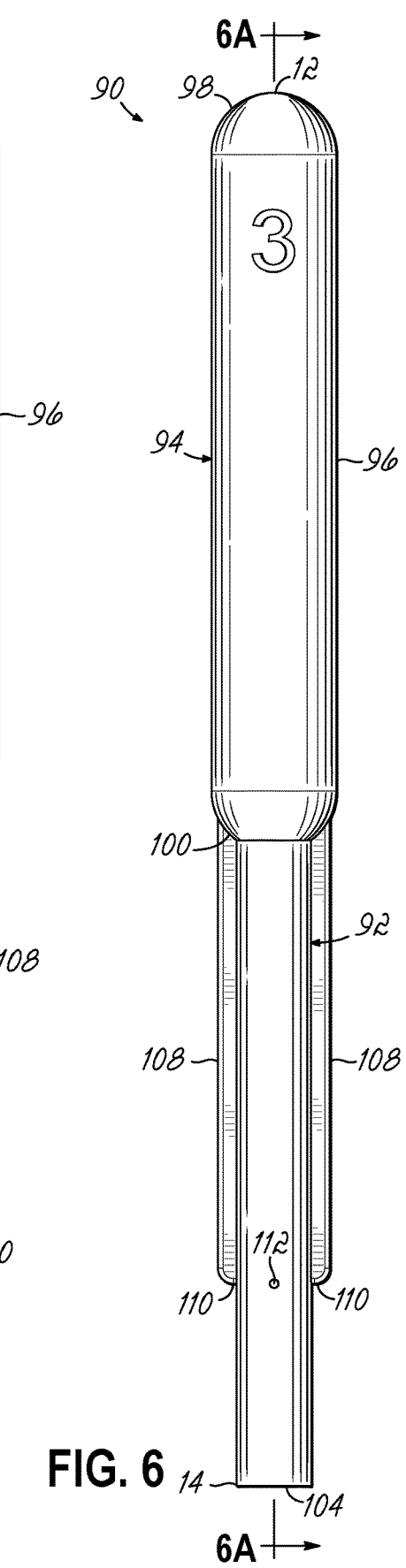
FIG. 6 is a front elevation view of the capillary transfer pipette of FIG. 5.
Figure 6A:
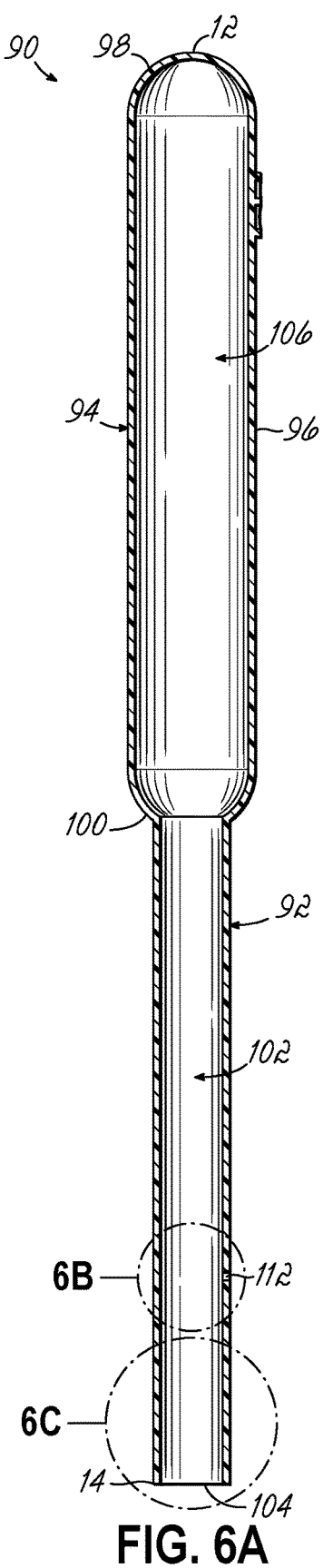
FIG. 6A is a side cross-sectional view of the capillary transfer pipette of FIG. 6, taken along line 6A-6A.
Figure 6B:
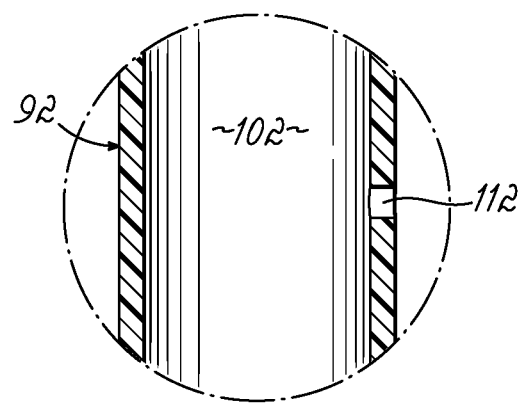
FIG. 6B is an enlarged cross-sectional view of a region of the capillary transfer pipette indicated in FIG. 6A.
Figure 6C:
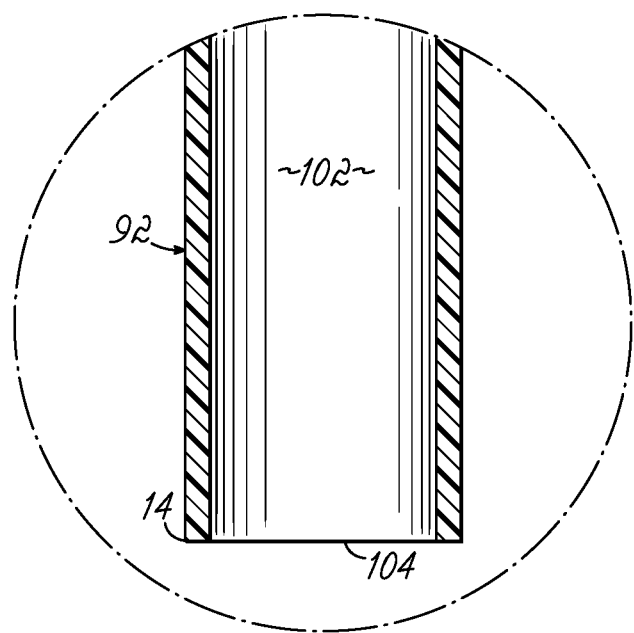
FIG. 6C is an enlarged cross-sectional view of a region of the capillary transfer pipette indicated in FIG. 6A.

Referring to FIGS. 5-6C, a capillary transfer pipette 90 according to another exemplary embodiment of the invention is shown. The capillary pipette 90 includes a draw tube 92 and a squeeze bulb 94 joined directly to and extending proximally from the draw tube 92. As such, the capillary pipette 90 is formed without a connecting tube, such as the connecting tube 18 of capillary pipette 10.

The squeeze bulb 94 includes an elongate tubular portion 96, a proximal domed portion 98 defining a closed end of the capillary transfer pipette 90, and a distal rounded tapered portion 100 connecting to a proximal end of the draw tube 92. As compared to squeeze bulb 20 of capillary pipette 10, squeeze bulb 94 of capillary pipette 90 is formed with a length that accounts for a much larger portion, such as at least half, of the total length of the capillary pipette 90. As shown in FIG. 6A, a lumen 102 extends proximally from a draw tube opening 104 at the distal end 14 to an air chamber 106 defined by the squeeze bulb 94. In the embodiment shown, the lumen 102 is formed with a uniform cross-sectional diameter along a full length of the draw tube 92.

As best shown in FIG. 6, the capillary pipette 90 further includes a pair of longitudinally extending fins 108 that project radially outward from the draw tube 92 at diametrically opposed positions. The fins 108 couple at their proximal ends to the distal rounded tapered portion 100 of the squeeze bulb 94, and extend distally along the draw tube 92. The fins 108 terminate at distal ends 110 that are spaced proximally from the draw tube opening 104 so as to prevent unintended attraction of excess liquid onto the fins 108 during use, as described above in connection with capillary pipette 10. The distal ends 110 are located so as to not extend distally beyond an air vent hole 112, and may be aligned with the air vent hole 112, as shown. Additionally, each of the fins 108 is formed with a radial dimension so as to not project radially beyond a maximum outer periphery of the squeeze bulb 94 defined by the tubular portion 96.

As best shown in FIGS. 6 and 6B, the air vent hole 112 extends radially through a sidewall of the draw tube 92, at a location spaced between the draw tube opening 104 and the squeeze bulb 94, and opens directly to the lumen 102. As described above in connection with capillary pipette 10, the air vent hole 112 may be positioned at any desired location along the length of the capillary pipette 90, including along the draw tube 92 or the squeeze bulb 94. The air vent hole 112 functions to vent air from within the capillary pipette 90 and thereby enable drawing of liquid by capillary action in a similar manner to the air vent hole 48 described above in connection with capillary pipettes 10, 50. Though not shown, one or more volume indicating elements may be provided on the draw tube 92.

Figure 8B:
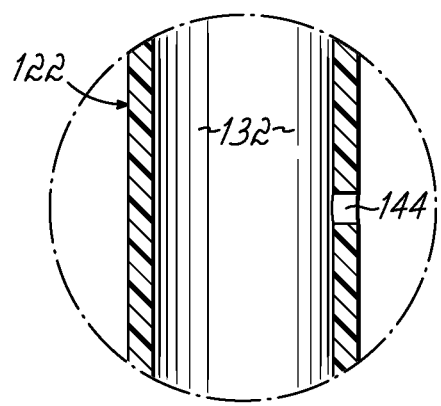
FIG. 8B is an enlarged cross-sectional view of a region of the capillary transfer pipette indicated in FIG. 8A.
Figure 8C:
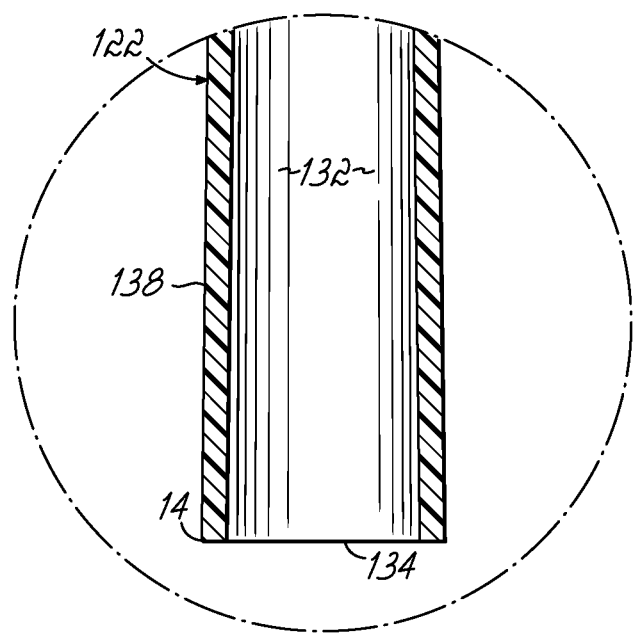
FIG. 8C is an enlarged cross-sectional view of a region of the capillary transfer pipette indicated in FIG. 8A.

Referring to FIGS. 7-8C, a capillary transfer pipette 120 according to another exemplary embodiment of the invention is shown. The capillary pipette 120 includes a draw tube 122 and a squeeze bulb 124 joined directly to and extending proximally from the draw tube 122. The squeeze bulb 124 includes an elongate tubular portion 126, a proximal domed portion 128 defining a closed end of the capillary transfer pipette 120, and a distal conical tapered portion 130 connecting to a proximal end of the draw tube 122. Similar to the capillary pipette 90, the squeeze bulb 124 of capillary pipette 120 accounts for at least half of the total length of the capillary pipette 90.

Figure 10:
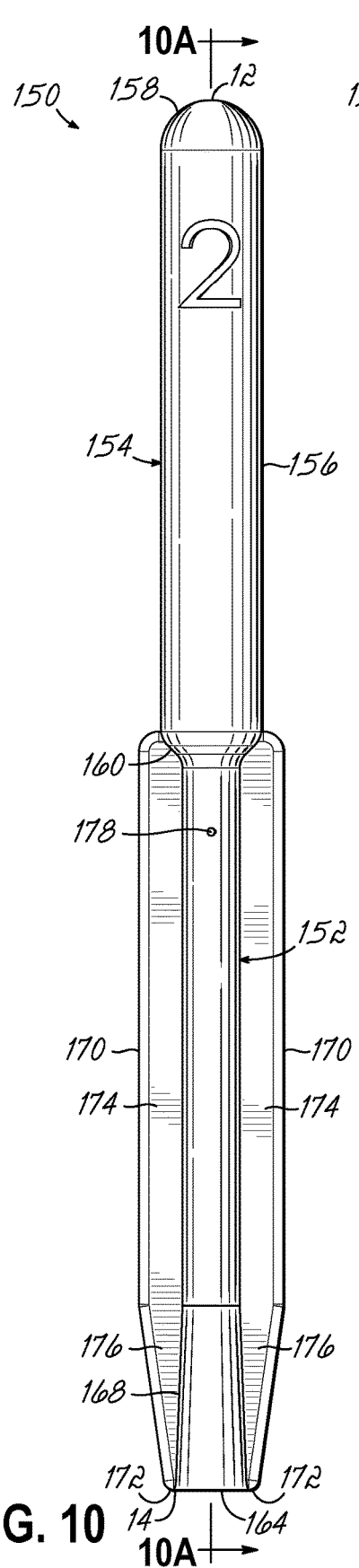
FIG. 10 is a front elevation view of the capillary transfer pipette of FIG. 9.

As shown in FIG. 8A, a lumen 132 extends proximally from a draw tube opening 134 at the distal end 14 to an air chamber 136 defined by the squeeze bulb 124. As best seen in FIGS. 8 and 8C, the draw tube 122 includes a flared distal end portion 138 that flares radially outward in a direction toward the draw tube opening 134. As will be evident upon comparison of FIGS. 8 and 8C to subsequent Figures showing capillary transfer pipettes of exemplary alternative embodiments also having flared distal end portions, such as FIG. 10 showing capillary pipette 150 having flared distal end portion 168, the flared distal end portion 138 of capillary pipette 120 may be formed with an outward flaring angle that is minimally evident. The lumen 132, which also flares radially outward through the flared distal end portion 138, is thus provided with a first diameter at its proximal end adjacent to the squeeze bulb 124, and a larger second diameter at its distal end defined by the draw tube opening 134.

As best shown in FIG. 8, the capillary pipette 120 further includes a pair of longitudinally extending fins 140 that project radially outward from the draw tube 122 at diametrically opposed positions. The fins 140 couple at their proximal ends to the distal conical tapered portion 130 of the squeeze bulb 124, and extend distally along the draw tube 122. Similar to fins 108 of capillary pipette 120, fins 140 terminate at distal ends 142 that are spaced proximally from the draw tube opening 134, and are located so as to not extend distally beyond an air vent hole 144. In the embodiment shown, the distal ends 142 are aligned with the air vent hole 144. Additionally, each of the fins 140 is formed with a radial dimension so as to not project radially beyond a maximum outer periphery of the squeeze bulb 124 defined by the tubular portion 126.

As best shown in FIGS. 8 and 8B, the air vent hole 144 extends radially through a sidewall of the draw tube 122, at a location spaced between the draw tube opening 134 and the squeeze bulb 124, and opens directly to the lumen 132. The air vent hole 144 may be positioned at any desired location along the length of the capillary pipette 120, including along the draw tube 122 or the squeeze bulb 124. Though not shown, one or more volume indicating elements may be provided on the draw tube 122.

Figure 9:
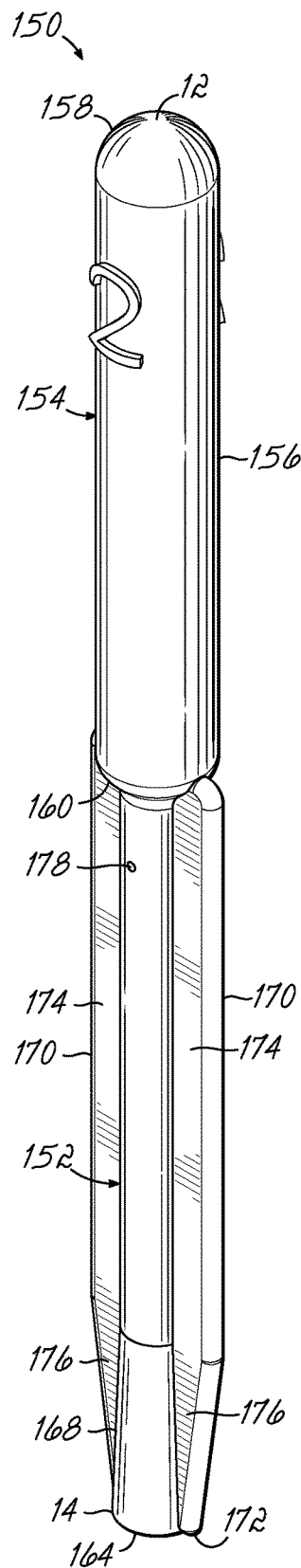
FIG. 9 is a front perspective view of a capillary transfer pipette according to another exemplary embodiment.
Figure 10A:
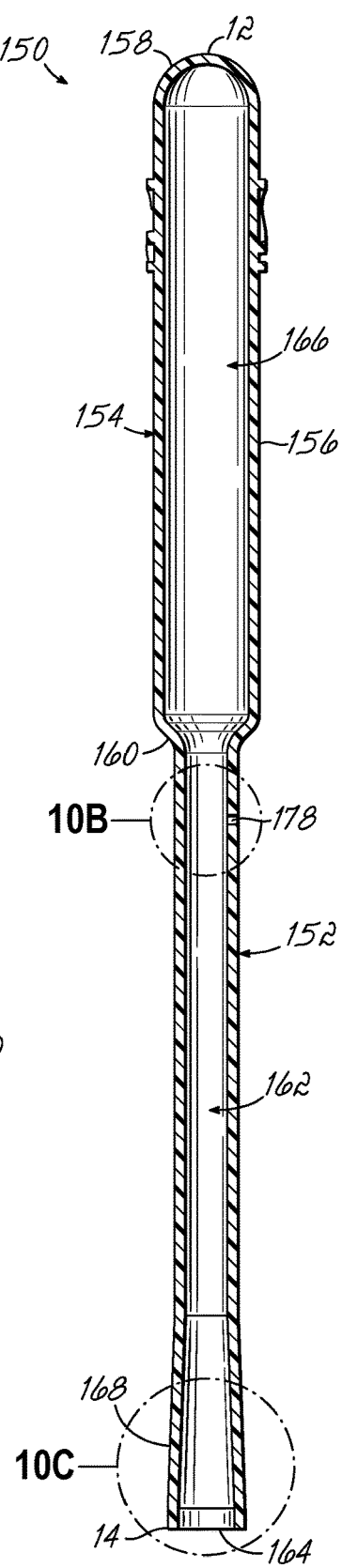
FIG. 10A is a side cross-sectional view of the capillary transfer pipette of FIG. 10, taken along line 10A-10A.
Figure 10B:
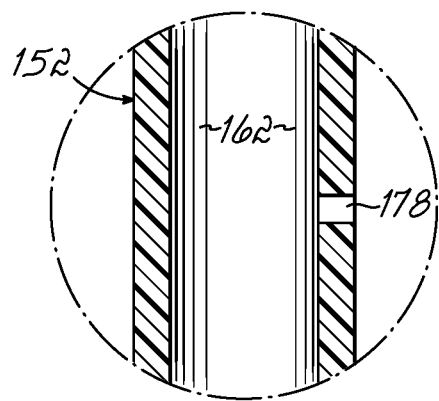
FIG. 10B is an enlarged cross-sectional view of a region of the capillary transfer pipette indicated in FIG. 10A.
Figure 10C:
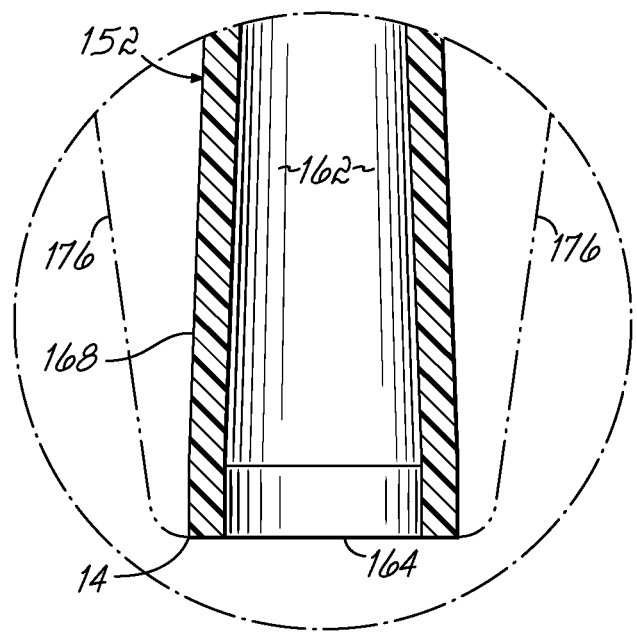
FIG. 10C is an enlarged cross-sectional view of a region of the capillary transfer pipette indicated in FIG. 10A.

Referring to FIGS. 9-10C, a capillary transfer pipette 150 according to another exemplary embodiment of the invention is shown. The capillary pipette 150 includes a draw tube 152 and a squeeze bulb 154 joined directly to and extending proximally from the draw tube 152. The squeeze bulb 154 includes an elongate tubular portion 156, a proximal domed portion 158 defining a closed end of the capillary pipette 150, and a distal conical tapered portion 160 connecting to a proximal end of the draw tube 152.

As shown in FIG. 10A, a lumen 162 extends proximally from a draw tube opening 164 at the distal end 14 to an air chamber 166 defined by the squeeze bulb 154. As best shown in FIGS. 10, 10A, and 10C, the draw tube 152 includes a flared distal end portion 168 that flares radially outward in a direction toward the draw tube opening 164. The lumen 162, which also flares radially outward through the flared distal end portion 168, is thus provided with a first diameter at its proximal end adjacent to the squeeze bulb 154, and a larger second diameter at its distal end defined by the draw tube opening 164.

As best shown in FIG. 10, the capillary pipette 150 further includes a pair of longitudinally extending fins 170 that project radially outward from the draw tube 152 at diametrically opposed positions. The fins 170 couple at their proximal ends to the distal conical tapered portion 160 of the squeeze bulb 154, and extend distally along the draw tube 152 for a full length of the draw tube 152, and terminate at distal ends 172 aligned with the draw tube opening 164. Each fin 170 includes a rectangular fin portion 174 that extends along a cylindrical portion of the draw tube 152, and a tapered fin portion 176 that extends distally from the rectangular fin portion 174 along the flared distal end portion 168 of the draw tube 152. The rectangular fin portion 174 projects radially outward from the draw tube 152 and extends radially beyond the tubular portion 156 of the squeeze bulb 154. The tapered fin portion 176 tapers radially inward in a direction toward the draw tube opening 164, and terminates at a tip that defines the distal end 172 of the fin 170.

As best shown in FIGS. 10 and 10B, the air vent hole 178 extends radially through a sidewall of the draw tube 152, for example in a proximal portion of the draw tube 152 as shown, and opens directly to the lumen 162. The air vent hole 178 may be positioned at any desired location along the length of the capillary pipette 150, including along the draw tube 152 or the squeeze bulb 154. Though not shown, one or more volume indicating elements may be provided on the draw tube 152.

Figure 11:
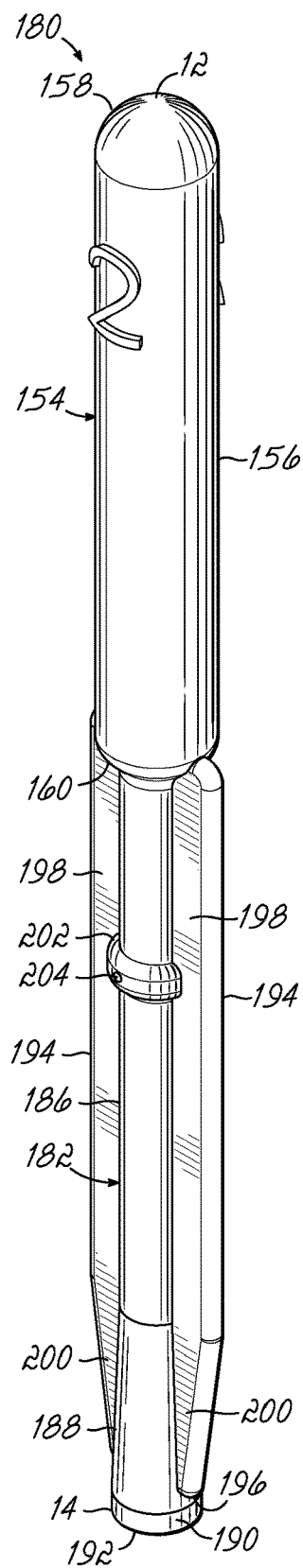
FIG. 11 is a front perspective view of a capillary transfer pipette according to another exemplary embodiment.
Figure 12:
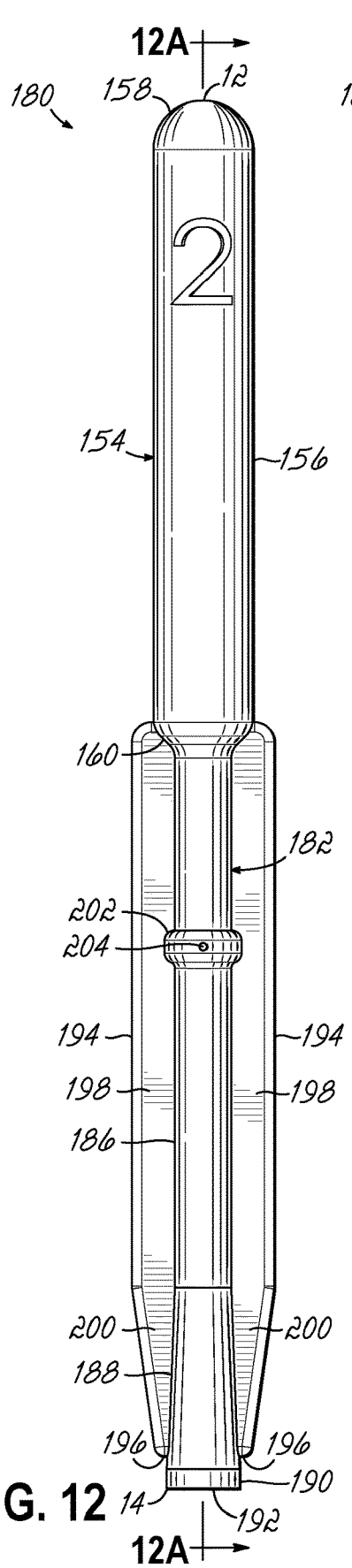
FIG. 12 is a front elevation view of the capillary transfer pipette of FIG. 11.
Figure 12A:
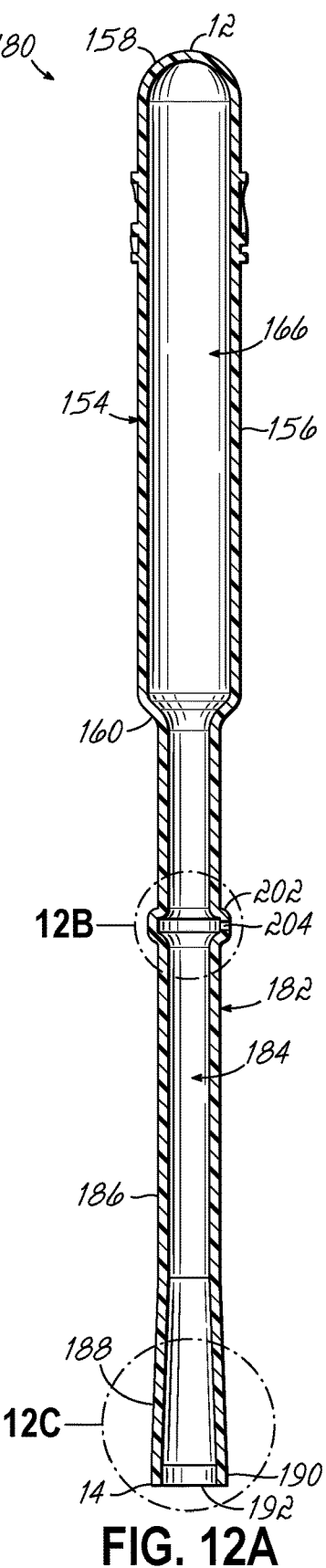
FIG. 12A is a side cross-sectional view of the capillary transfer pipette of FIG. 12, taken along line 12A-12A.
Figure 12B:
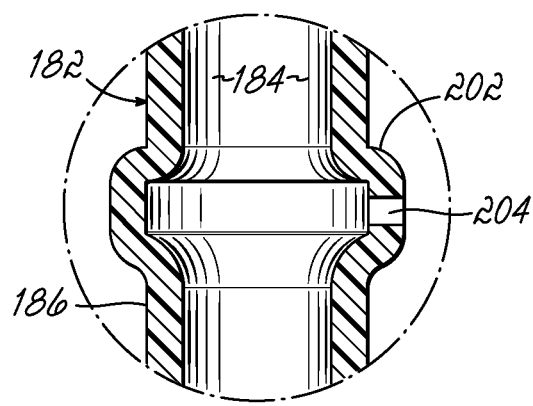
FIG. 12B is an enlarged cross-sectional view of a region of the capillary transfer pipette indicated in FIG. 12A.
Figure 12C:
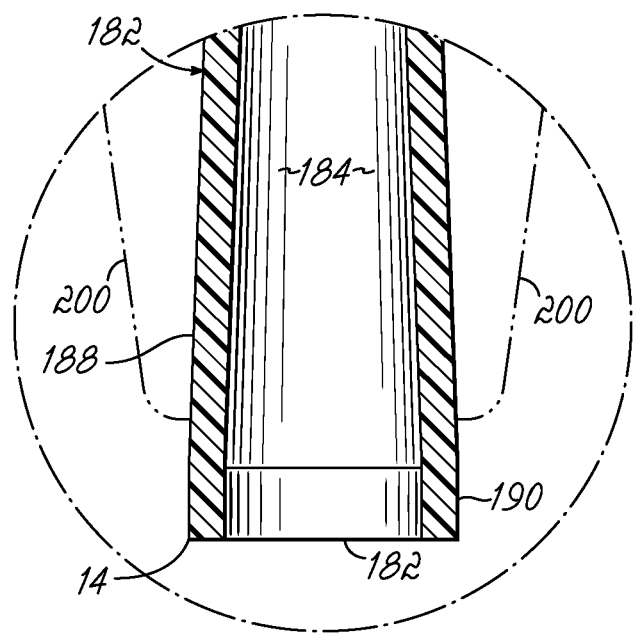
FIG. 12C is an enlarged cross-sectional view of a region of the capillary transfer pipette indicated in FIG. 12A.

Referring to FIGS. 11-12C, a capillary transfer pipette 180 according to another exemplary embodiment of the invention is shown. As indicated by like reference numerals in the Figures, capillary transfer pipette 180 is similar in construction to capillary transfer pipette 150, excepted as otherwise described below.

The capillary transfer pipette 180 includes a draw tube 182 defining a lumen 184, shown in FIG. 12A. As shown in FIGS. 12 and 12A, the draw tube 182 includes a cylindrical proximal portion 186, a flared distal end portion 188 extending distally from the cylindrical proximal portion 186, and a cylindrical distal end portion 190 extending distally from the flared distal end portion 188 and defining a draw tube opening 192. As shown, the cylindrical distal end portion 190 may have an axial length that is substantially shorter than axial lengths of the flared distal end portion 188 and the cylindrical proximal portion 186. The flared distal end portion 188, and the portion of the lumen 184 extending therethrough, flares radially outward in a direction toward the draw tube opening 192. Accordingly, as shown in FIG. 12A, the lumen 184 is provided with a proximal cylindrical portion having a first diameter, a distal cylindrical portion having a second larger diameter, and radially outward flaring portion extending therebetween.

As best shown in FIG. 12, the capillary transfer pipette 180 includes longitudinally extending fins 194 having distal ends 196 that are spaced proximally from the draw tube opening 192 and are located along the flared distal end portion 188 of the draw tube 182. Each fin 194 includes a rectangular fin portion 198 similar to rectangular fin portion 174, and a tapered fin portion 200 similar to tapered fin portion 176. The tapered fin portion 200 extends distally from the rectangular fin portion 198 along the flared distal end portion 188 of the draw tube 182, and terminates at a tip defining the fin distal end 196.

The capillary transfer pipette 180 further includes a volume indicating element shown in the form of an annular rib 202 arranged on the draw tube 182 proximally of the flared distal end portion 188. Whereas the volume indicating rib 46 of capillary pipette 10 is shown having a rounded profile, volume indicating rib 202 of capillary pipette 180 is shown having a generally rectangular profile, as best seen in FIG. 12B. It will be appreciated that the volume indicating ribs of any of the exemplary embodiments disclosed herein may be provided with any rounded, rectangular, or alternatively shaped profile as desired.

As shown best in FIGS. 12 and 12B, an air vent hole 204 extends radially through the volume indicating rib 202 and opens directly to the lumen 184. While shown located on a proximal portion of the draw tube 182, the air vent hole 204 and volume indicating rib 202 may be provided at any desired location along the draw tube 182. In alternative embodiments, multiple volume indicating ribs 202 may be provided, and the air vent hole 204 may be located in alignment with or proximally of the proximal-most volume indicating rib 202, such as along the squeeze bulb 154, for example.

Figure 13:
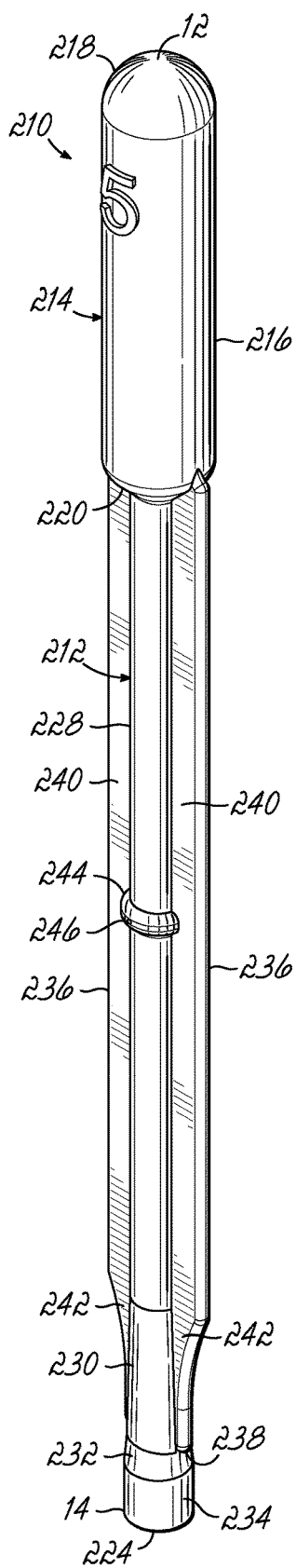
FIG. 13 is a front perspective view of a capillary transfer pipette according to another exemplary embodiment.
Figure 14:
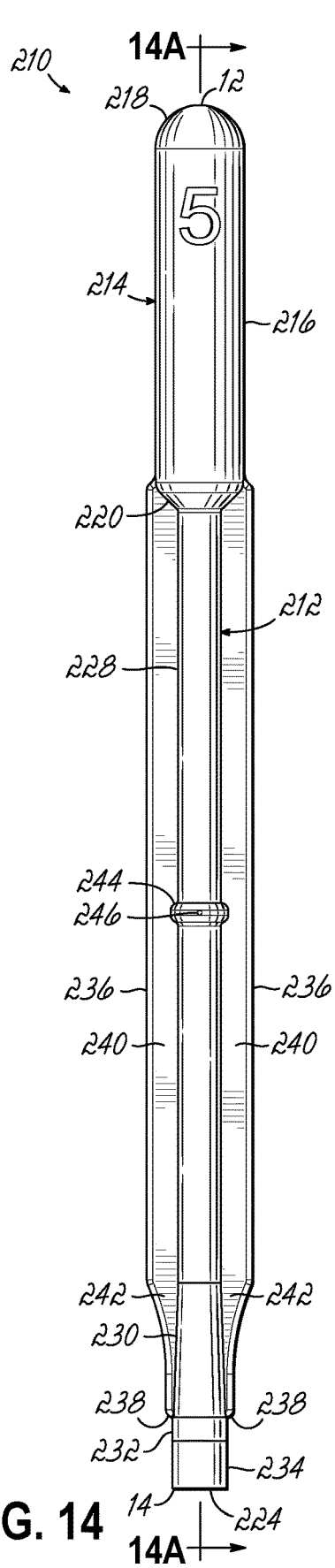
FIG. 14 is a front elevation view of the capillary transfer pipette of FIG. 13.
Figure 14A:
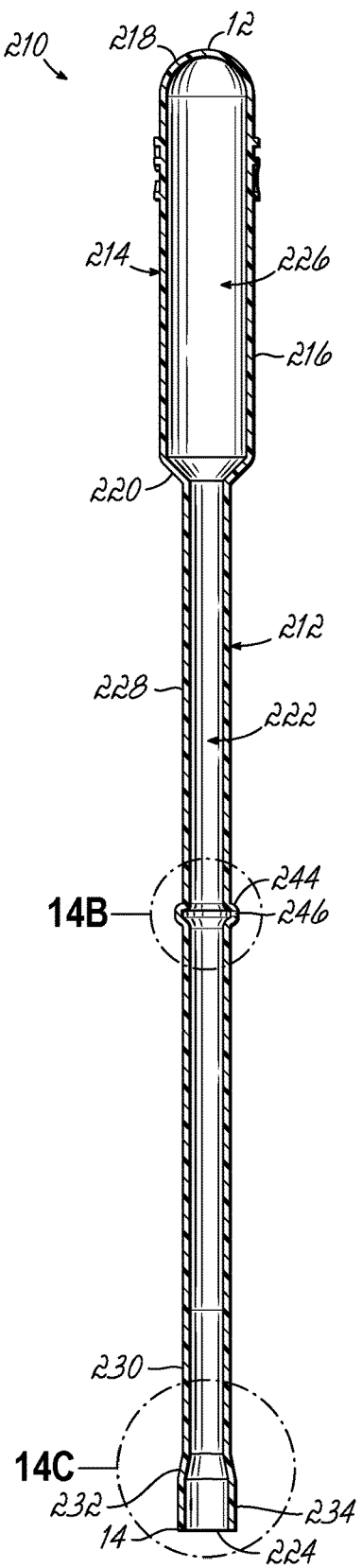
FIG. 14A is a side cross-sectional view of the capillary transfer pipette of FIG. 14, taken along line 14A-14A.
Figure 14B:
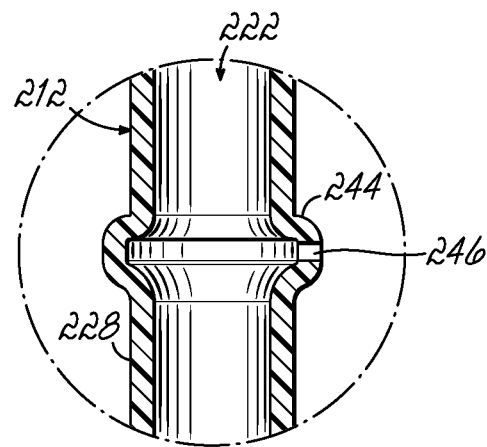
FIG. 14B is an enlarged cross-sectional view of a region of the capillary transfer pipette indicated in FIG. 14A.
Figure 14C:
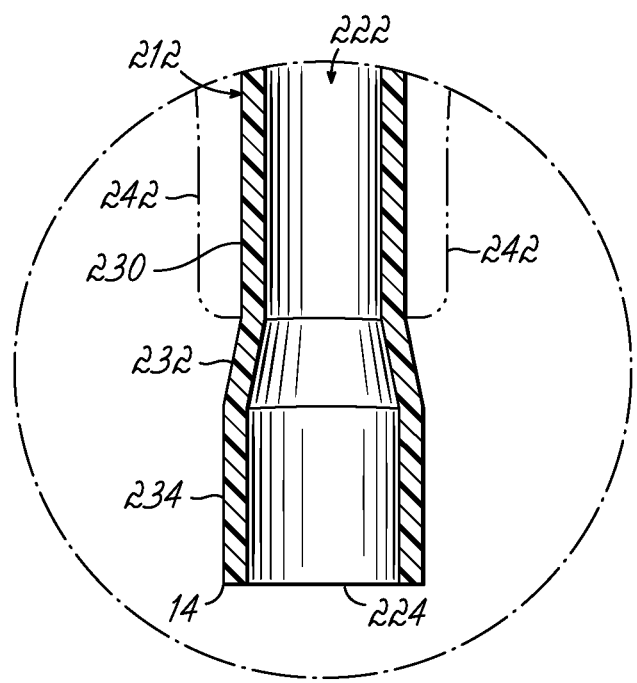
FIG. 14C is an enlarged cross-sectional view of a region of the capillary transfer pipette indicated in FIG. 14A.

Referring to FIGS. 13-14C, a capillary transfer pipette 210 according to another exemplary embodiment of the invention is shown. The capillary pipette 210 includes a draw tube 212 and a squeeze bulb 214 joined directly to and extending proximally from the draw tube 212. The squeeze bulb 214 includes an elongate tubular portion 216, a proximal domed portion 218 defining a closed end of the capillary pipette 210, and a distal conical tapered portion 220 connecting to a proximal end of the draw tube 212.

As shown in FIG. 14A, the draw tube 212 defines a lumen 222 that extends proximally from a draw tube opening 224 at the distal end 14 to an air chamber 226 defined by the squeeze bulb 214. As shown in FIGS. 13-14A and 14C, the draw tube 212 includes a cylindrical proximal portion 228, a first flared distal end portion 230 extending distally from the cylindrical proximal portion 228, a second flared distal end portion 232 extending distally from the first flared distal end portion 230, and a cylindrical distal end portion 234 extending distally from the second flared distal end portion 232 and defining the draw tube opening 224. As shown, the cylindrical proximal portion 228 may have an axial length that is substantially longer than the distal end portions 230, 232, 234 in combination.

The first and second flared distal end portions 230, 232 each flare radially outward in a direction toward the draw tube opening 224. As shown by a comparison of FIGS. 14 and 14A, the first and second flared distal end portions 230, 232 may each be shaped so as to flare radially outward along a respective single transverse (i.e., radial) axis. Further, the first and second flared distal end portions 230, 232 may be formed relative to one another such that the transverse flaring axis of the first flared distal end portion 230 is oriented generally perpendicular to the transverse flaring axis of the second flared distal end portion 232. Accordingly, in the front view shown in FIG. 14, only the first flared distal end portion 230 appears flared while the second flared distal end portion 232 appears cylindrical. By comparison, in the cross-sectional side view shown in FIG. 14A, only the second flared distal end portion 232 appears flared while the first flared distal end portion 230 appears cylindrical. The lumen 222 extends through the various portions of the draw tube 212 and thus is provided with a proximal cylindrical portion having a first diameter, a distal cylindrical portion having a second larger diameter, and first and second flaring portions extending therebetween.

As best shown in FIG. 14, the capillary pipette 210 further includes a pair of longitudinally extending fins 236 that project radially outward from the draw tube 212 at diametrically opposed positions. The fins 236 couple at their proximal ends to the squeeze bulb 214 at its distal conical tapered portion 220 and a lower edge of its tubular portion 216. The fins 236 extend distally along the draw tube 212 and terminate at distal ends 238 spaced proximally from the draw tube opening 224, at a location generally coinciding with a distal end of the first flared distal end portion 230.

Each fin 236 includes a rectangular fin portion 240 that extends along the cylindrical proximal portion 228 of the draw tube 212, and a tapered fin portion 242 that extends distally from the rectangular fin portion 240 along the first flared distal end portion 230. The rectangular fin portion 240 projects radially outward from the draw tube 152 and extends radially beyond the tubular portion 216 of the squeeze bulb 214. The tapered fin portion 242 tapers radially inward in a direction toward the draw tube opening 224, and terminates at a tip that defines the fin distal end 238. As shown, an outer edge of the tapered fin portion 242 may taper radially inward along a concave arcuate path.

As best shown in FIGS. 14 and 14B, the capillary transfer pipette 210 further includes a volume indicating element, shown in the form of an annular rib 244, arranged on the draw tube 212. An air vent hole 246 extends radially through the volume indicating rib 244 and opens directly to the lumen 222. While shown located on the cylindrical proximal portion 228 of the draw tube 212, the air vent hole 246 and volume indicating rib 244 may be provided at any desired location along the draw tube 212. In alternative embodiments, multiple volume indicating ribs 244 may be provided, and the air vent hole 246 may be located in alignment with or proximally of the proximal-most volume indicating rib 244, such as along the squeeze bulb 214, for example.

Figures 15, 15A:
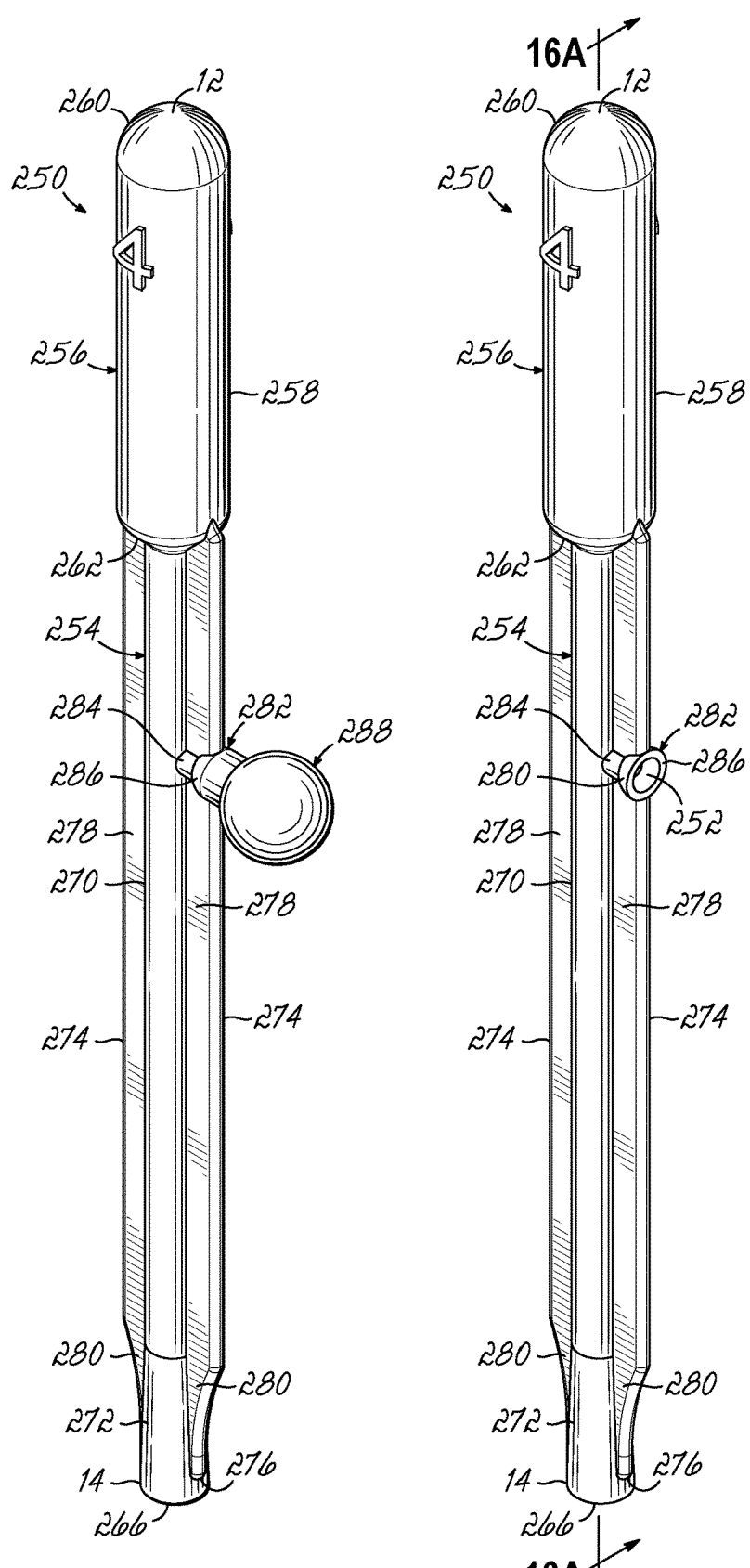
FIG. 15 is a front perspective view of a capillary transfer pipette according to another exemplary embodiment, shown at an intermediate stage of manufacture.
FIG. 15A is a front perspective view similar to FIG. 15, showing the capillary transfer pipette at a final stage of manufacture.
Figure 16:
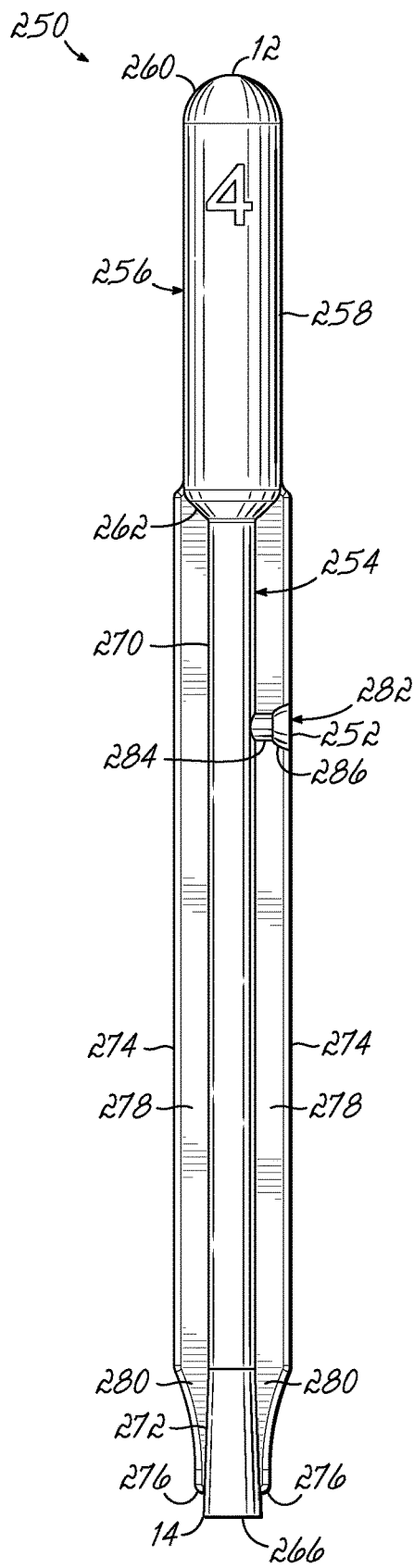
FIG. 16 is a front elevation view of the capillary transfer pipette of FIG. 15A.
Figure 16A:
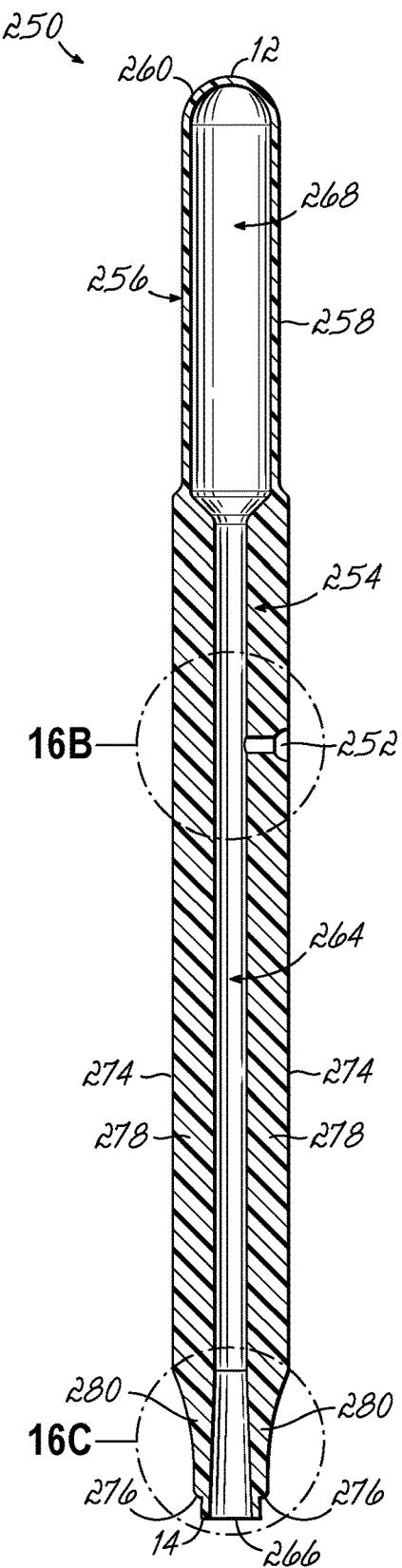
FIG. 16A is a front cross-sectional view of the capillary transfer pipette of FIG. 15A, taken along line 16A-16A.
Figure 16B:
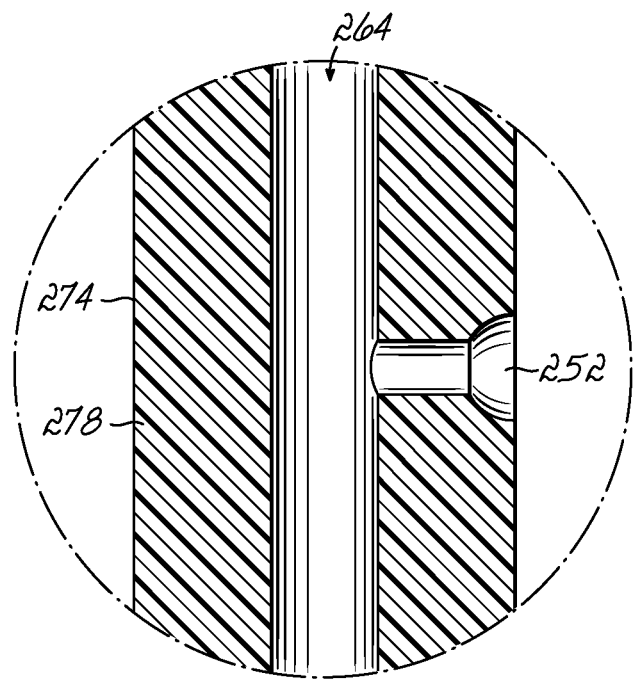
FIG. 16B is an enlarged cross-sectional view of a region of the capillary transfer pipette indicated in FIG. 16A.
Figure 16C:
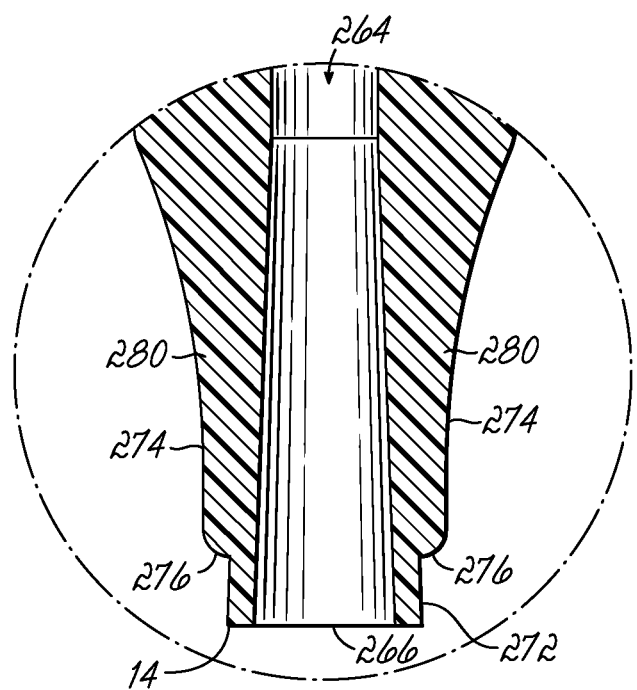
FIG. 16C is an enlarged cross-sectional view of a region of the capillary transfer pipette indicated in FIG. 16A.

Referring to FIGS. 15-16C, a capillary transfer pipette 250 according to another exemplary embodiment of the invention is shown. As shown in FIG. 15A, and described in greater detail below, the capillary pipette 250 includes an air vent hole 252 having an exemplary alternative structure as compared to the air vent holes of capillary pipettes 10, 50, 90, 120, 150, 180, and 210 described above. To that end, FIG. 15 shows the capillary pipette 250 at an intermediate stage of manufacture, while FIGS. 15A-16C show the capillary pipette 250 at a final stage of manufacture at which the air vent hole 252 has been exposed.

The capillary pipette 250 includes a draw tube 254 and a squeeze bulb 256 joined directly to and extending proximally from the draw tube 254. The squeeze bulb 256 includes an elongate tubular portion 258, a proximal domed portion 260 defining a closed end of the capillary pipette 250, and a distal conical tapered portion 262 connecting to a proximal end of the draw tube 254.

As shown in FIG. 16A, the draw tube 254 defines a lumen 264 that extends proximally from a draw tube opening 266 at the distal end 14 to an air chamber 268 defined by the squeeze bulb. As shown in FIGS. 15-16, the draw tube 254 includes a cylindrical proximal portion 270 and a flared distal end portion 272 extending distally from the cylindrical proximal portion 270 and defining the draw tube opening 266. As shown, the cylindrical proximal portion 270 may have an axial length that is substantially longer than the flared distal end portion 272. The flared distal end portion 272 flares radially outward in a direction toward the draw tube opening 266.

As best shown in FIG. 16, the capillary pipette 250 further includes a pair of longitudinally extending fins 274 that project radially outward from the draw tube 254 at diametrically opposed positions. The fins 274 couple at their proximal ends to the squeeze bulb 256 at its distal conical tapered portion 262 and a lower edge of its tubular portion 258. The fins 274 extend distally along the draw tube 254 and terminate at distal ends 276 spaced proximally from the draw tube opening 266, at a location along the flared distal end portion 272.

Each fin 274 includes a rectangular fin portion 278 that extends along the cylindrical proximal portion 270 of the draw tube 254, and a tapered fin portion 280 that extends distally from the rectangular fin portion 278 along the flared distal end portion 272. The rectangular fin portion 278 projects radially outward from the draw tube 254 and extends radially beyond the tubular portion 258 of the squeeze bulb 256. The tapered fin portion 280 tapers radially inward in a direction toward the draw tube opening 266, and terminates at a tip that defines the fin distal end 276. As shown, an outer edge of the tapered fin portion 280 may taper radially inward along a concave arcuate path.

As shown best in FIGS. 15A and 16, the capillary pipette 250 includes a port structure 282 defining the air vent hole 252 that opens to the lumen 264. The port structure 282 is shown having a tubular port portion 284 that projects radially outward from the cylindrical proximal portion 270 of the draw tube 254 and extends through a fin 274, and a conical flared port portion 286 that extends to an outer edge of the fin 274 and defines an outer opening of the air vent hole 252. Accordingly, as best shown in FIGS. 16A and 16B, the air vent hole 252 is in the form of a radially extending passage having a tubular portion that communicates directly with the lumen 264, and an outwardly flaring conical portion that communicates with an ambient environment. Though structurally different from the air vent holes of capillary pipettes 10, 50, 90, 120, 150, 180, and 210 described above, the air vent hole 252 of capillary pipette 250 functions in substantially similar manner.

Referring back to FIG. 15, the capillary transfer pipette 250 is shown at an exemplary intermediate stage of manufacture. In an exemplary embodiment, the capillary pipette 250 may be formed through an extrusion blow molding process, such as the exemplary process described below, for example. To that end, a corresponding blow mold apparatus may include a mold cavity having a cavity portion suitably shaped to define a bulb structure, such as bulb structure 288 shown in FIG. 15, which extends radially outward from the conical flared port portion 286 of the port structure 282. When the blow-molded capillary pipette 250 is released from the blow mold apparatus, the bulb structure 288 may then be removed from the port structure 282 to thereby expose the air vent hole 252, as shown in FIG. 15A. In exemplary embodiments, removal of the bulb structure 288 may be performed by cutting the bulb structure 288 away from the port structure 282 with an automated cutting device (not shown) integrated within, or otherwise cooperating with, a blow mold apparatus, such as apparatus 300 described below. For example, the automated cutting device may slice the bulb structure 288 away immediately before the capillary pipette 250 is ejected from the blow mold apparatus 300.

In another exemplary embodiment, the bulb structure 288 of capillary pipette 250 may be left intact with the port structure 282 following blow molding. Instead of removing the bulb structure 288 to expose the air vent passage 252, an auxiliary air vent hole (not shown) may be formed in a sidewall of the bulb structure 288, thereby allowing the air vent passage 252 to vent air to the external environment via an internal air chamber within the bulb structure 288. The auxiliary air vent hole may be formed using any suitable method, such as an adaptation of the hole piercing method described below in connection with exemplary blow mold apparatus 300.

Referring to FIGS. 17-19C, an exemplary blow mold apparatus 300, and related method for extrusion blow molding a capillary transfer pipette according to an exemplary embodiment of the invention, is shown. As shown best in FIG. 17, the blow mold apparatus 300 generally includes a front mold plate 302, a rear mold plate 304, and a plurality of piercing modules 306 received and supported within module sockets 308 formed in an outer face of the front mold plate 302.

Figure 17:
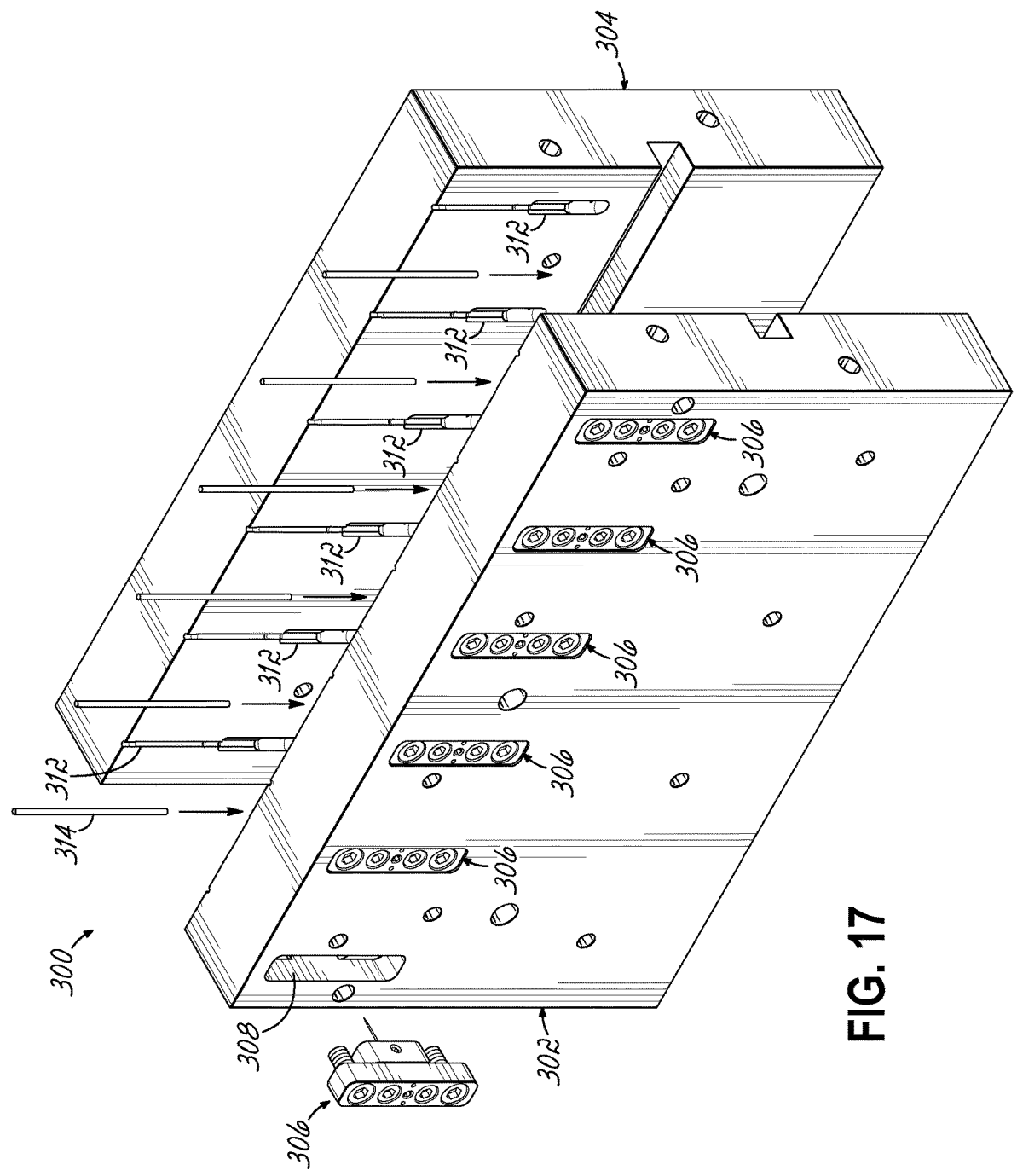
FIG. 17 is a front perspective view of a blow mold apparatus according to an exemplary embodiment of the invention, showing front and rear mold plates of the apparatus separated from one another.
Figure 18A:
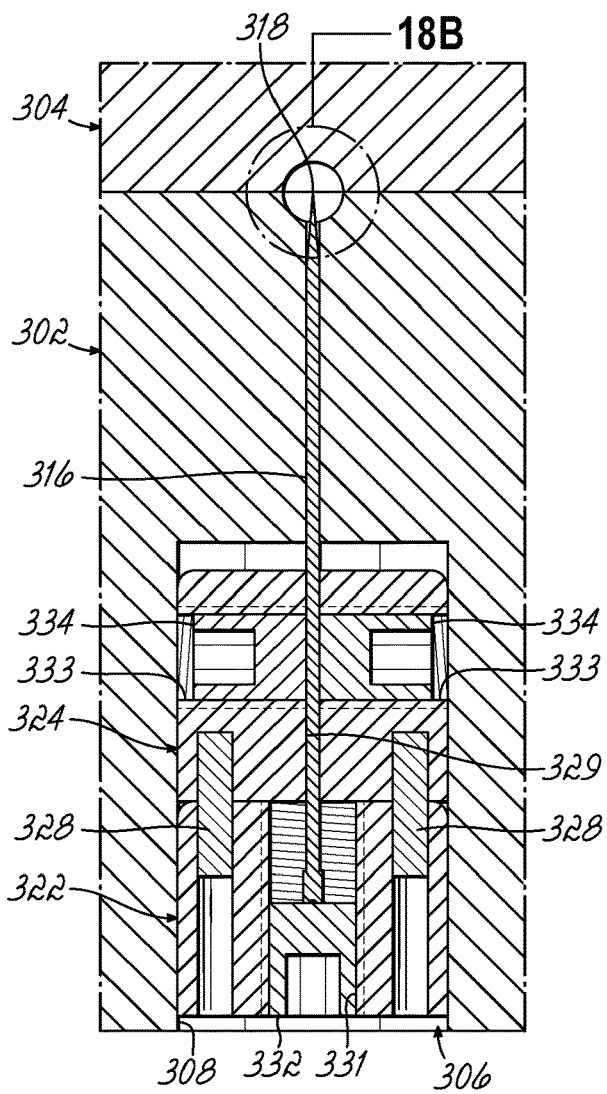
FIG. 18A is a top cross-sectional view of the blow mold apparatus of FIG. 17 in an assembled form, focused on and showing details of a piercing module and a corresponding mold cavity.
Figure 18B:
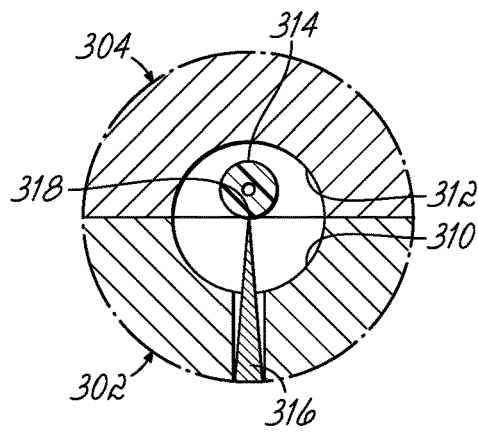
FIG. 18B is an enlarged top cross-sectional view of the mold cavity of FIG. 18A, showing a parison in a pre-blown configuration arranged within the mold cavity, and a piercing member of the piercing module projecting into the mold cavity.
Figure 19A:
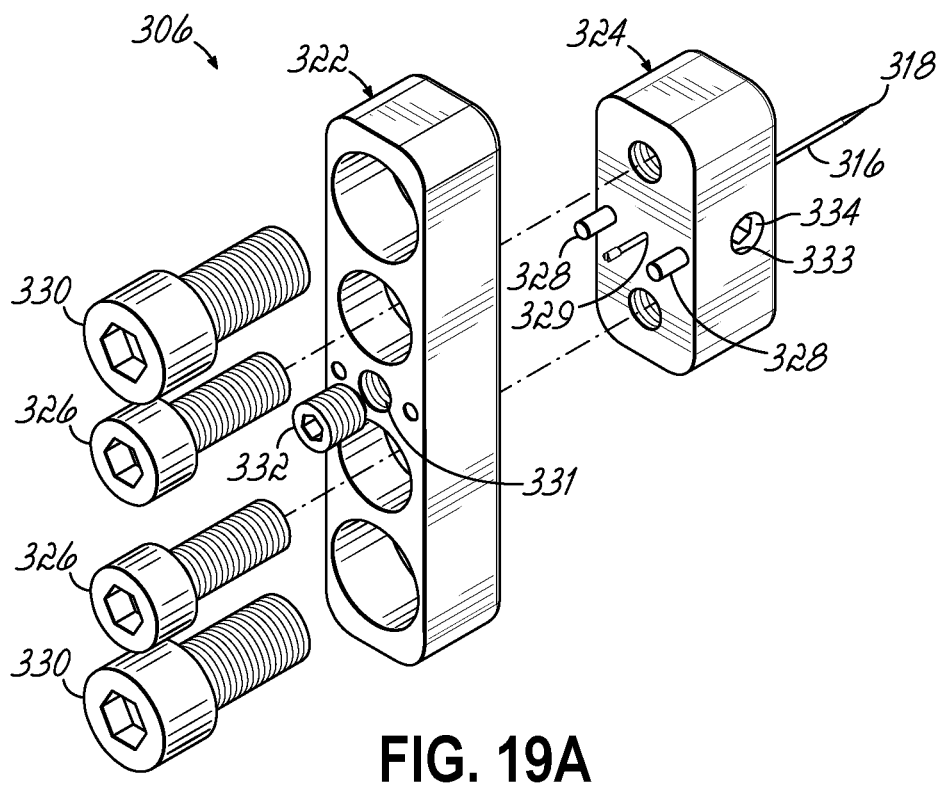
FIG. 19A is a perspective disassembled view of a piercing module of the blow mold apparatus of FIG. 17.
Figure 19B:
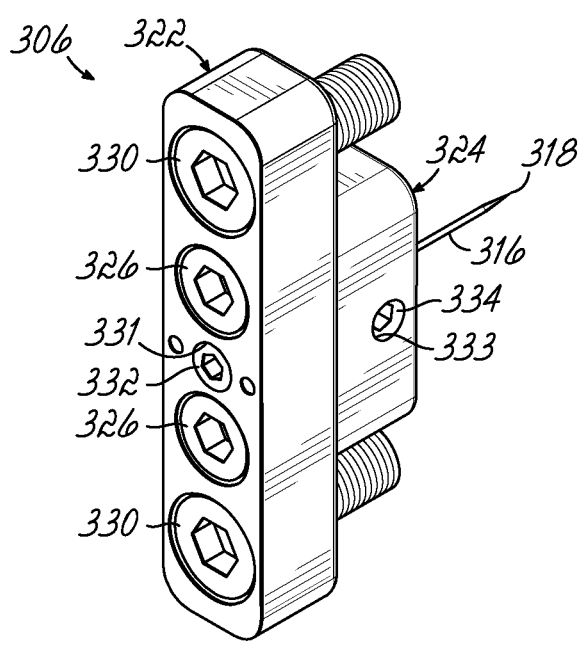
FIG. 19B is an assembled view of the piercing module of FIG. 19A.
Figure 19C:
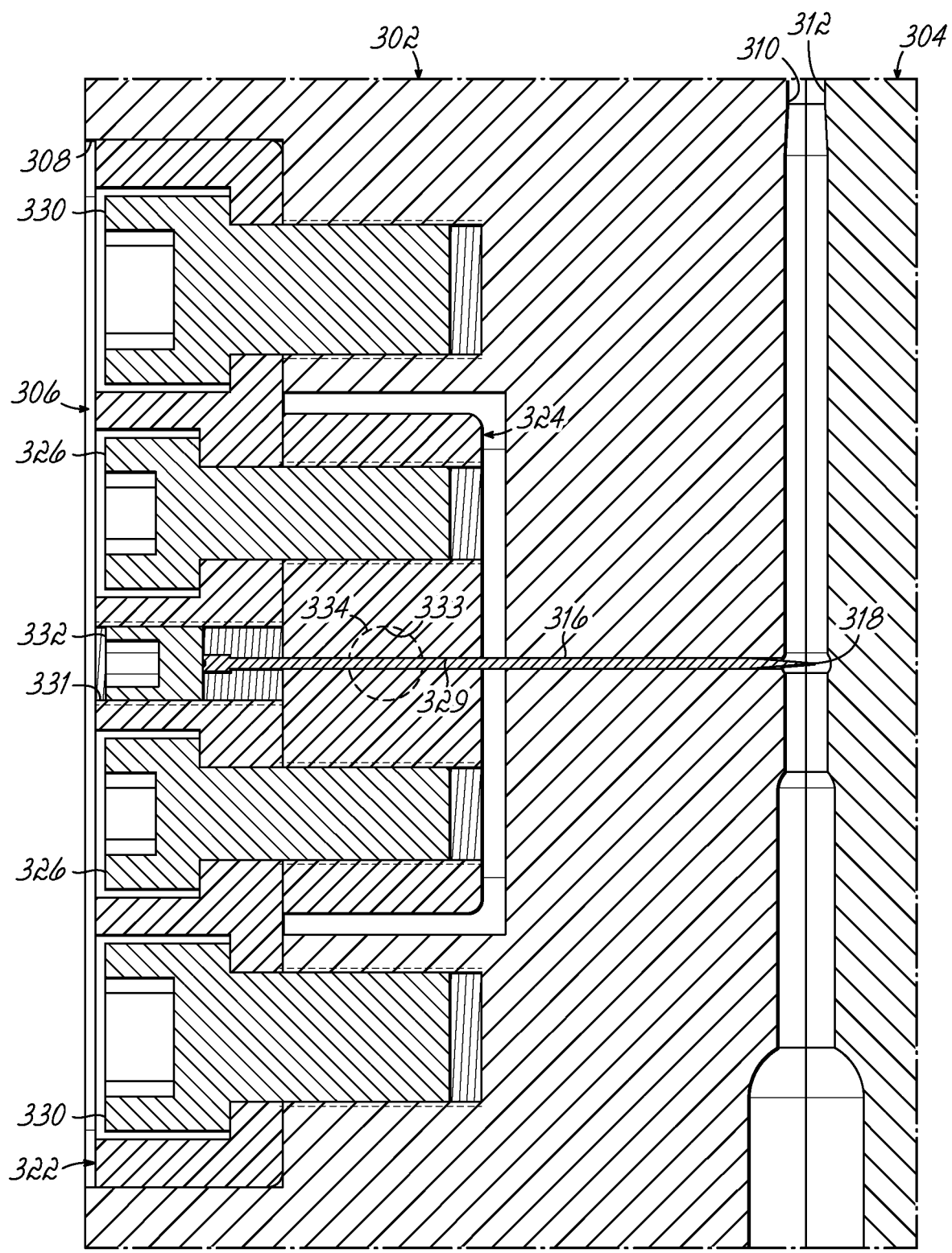
FIG. 19C is a side cross-sectional view of the piercing module of FIG. 19A, shown mounted to the assembled front and rear mold plates of FIG. 17.

The front mold plate 302 includes a first plurality of depressions 310, shown best in FIGS. 18B and 19C, each defining a front half of a respective mold cavity shaped to form a selected capillary transfer pipette. The rear mold plate 304 includes a second plurality of depressions 312, shown best in FIGS. 17, 18B, and 19C, each defining a rear half of the respective mold cavity. Accordingly, the front mold plate 302 defines front cavity wall portions defining front halves of the mold cavities, and the rear mold plate 304 defines rear cavity wall portions defining rear halves of the mold cavities. While the front and rear mold plates 302, 304 are shown having depressions 310, 312 defining mold cavities suitably shaped for blow molding the capillary transfer pipette 10 of FIG. 1, the mold plate depressions 310, 312 may be alternatively shaped as desired for blow molding capillary transfer pipettes of various alternative configurations, such as any of the other capillary pipettes 50, 90, 120, 150, 180, 210, and 250 described above, for example. Moreover, the front and rear mold plates 302, 304 may be suitably sized and shaped to define any desired quantity of mold cavities for blow molding one or more types of capillary transfer pipettes.

In use according to an exemplary embodiment, a plurality of cylindrical parisons 314 of molten polymeric material, such as any of the exemplary polymeric materials described above, are extruded using one or more extruder devices of any suitable type known in the art. As shown in FIG. 17, the parisons 314 are then positioned between the front and rear mold plates 302, 304 such that each parison 314 is positioned in alignment within a respective mold cavity. The front and rear mold plates 302, 304 are then clamped together with the parisons 314 positioned within the mold cavities, as shown best in FIGS. 18A and 18B. Air is then injected into each parison 314 through a respective blow pin (not shown) inserted into a proximal end of the parison 314. As air is injected, internal air pressure builds within the parison 314, causing the parison 314 to expand outwardly within its mold cavity and conform to the cavity wall, as shown in FIG. 18C, and thereby define a capillary transfer pipette.

Referring to FIGS. 18A-18O, the piercing modules 306 of the blow mold apparatus 300 operate to pierce air vent holes through the sidewall of a respective parison 314 during blow molding, while the parison 314 remains positioned within its mold cavity. In this regard, the piercing modules 306 may be implemented to pierce the air vent holes of any of the exemplary pipettes 10, 50, 90, 120, 150, 180, and 210 described above. Each piercing module 306 includes a piercing member, shown in the form of an elongate needle 316 having a tip 318. The needle 316 is suitably supported such that the needle tip 318 projects laterally into the respective mold cavity.

Figure 18C:
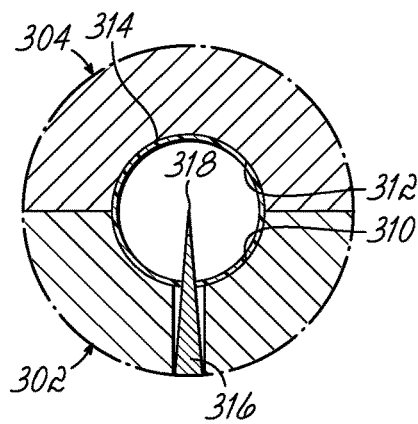
FIG. 18C is an enlarged top cross-sectional view similar to FIG. 18B, showing the parison in a blown configuration and the piercing member piercing through a sidewall of the blown parison.

In one embodiment, as shown in FIGS. 18B and 18C, the piercing needle 316 of each piercing module 306 may be secured in a stationary position throughout the blow molding process. As the parison 314 expands radially outward within the mold cavity during air injection, a sidewall of the parison is forced against the needle tip 318 so that the needle tip 318 pierces through the parison sidewall, as shown in FIG. 18C, thereby forming an air vent hole.

Figure 18D:
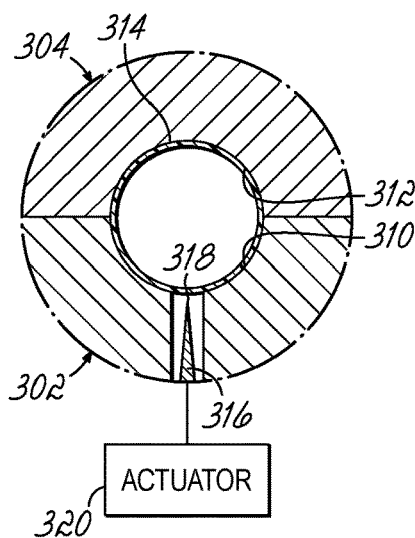
FIG. 18D is an enlarged top cross-sectional view similar to FIG. 18C, showing an exemplary alternative embodiment in which the piercing member is actuated by an actuator, the piercing member being shown in a retracted position.
Figure 18E:
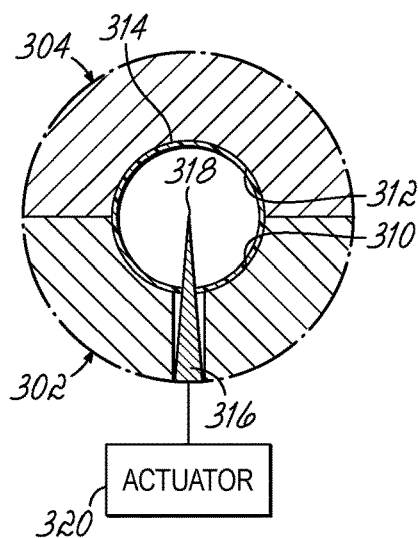
FIG. 18E is an enlarged top cross-sectional view similar to FIG. 18D, showing the piercing member in an extended position for piercing a sidewall of the blown parison.

FIGS. 18D and 18E show another exemplary embodiment in which the needle 316 is coupled at its proximal end to an actuator 320, represented diagrammatically. The actuator 320 may be selectively controlled to actuate the needle 316 between a retracted position, shown in FIG. 18D, in which the needle tip 318 is retracted from the mold cavity, and an extended position, shown in FIG. 18E, in which the needle tip 318 extends into the mold cavity. For example, the needle 316 may be held in the retracted position until the parison 314 reaches a fully blown configuration, at which point the actuator 320 may extend the needle 316 into the mold cavity to form an air vent hole, as shown in FIG. 18E, and then quickly return the needle 316 to its retracted position. The actuator 320 may include any suitable pneumatic, hydraulic, or motorized drive, for example, for moving the needle 316 between the extended and retracted positions.

Referring to FIGS. 19A-19O, details of the piercing module 306 are shown in greater detail. The piercing module 306 of the exemplary embodiment shown in FIGS. 19A-19O is configured to support the piercing needle 316 in a stationary position throughout the blow molding process. However, as described above, an actuator 320 may be coupled to or otherwise incorporated within the piercing module 306 to provide actuation of the needle 316.

The piercing module 306 generally includes a base block 322, a needle support block 324 coupled to the base block 322, and the piercing needle 316. The needle support block 324 is removably coupled to the base block 322 with fasteners 326 and is maintained in alignment with the base block 322 with pins 328. The base block 322, in turn, is removably coupled to the front mold plate 302 with fasteners 330, as shown in FIG. 19C.

As shown best in FIGS. 18A, 19A, and 19C, the needle support block 324 includes a needle bore 329 through which the piercing needle 316 is slidably received. The needle bore 329 aligns coaxially with a threaded bore 331 formed in the base block 322, in which an axial set screw 332 is threadedly received. The axial set screw 332 engages a proximal end of the needle 316 and is rotatable for adjusting an axial position of the needle 316 relative to the mold cavity.

As shown best in FIGS. 18A and 19A, the support block 324 further includes a pair of laterally extending threaded bores 333 arranged at opposed lateral positions and which communicate with the needle bore 329. Each laterally extending bore 333 threadedly receives a respective lateral set screw 334 that is rotatable to engage a respective side of the needle 316. The lateral set screws 334 may be rotated toward one another to clamp the needle 316 therebetween and thereby fix the axial position of the needle 316 within the needle bore, as shown in FIG. 18A. The axial set screw 332 and lateral set screws 334 may be adjusted as desired to secure the needle 316 at any suitable axial position.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A capillary transfer pipette, comprising:
    a draw tube having a distal end defining a draw tube opening through which liquid is drawn via capillary action, a proximal end, and a lumen extending therebetween;
    a squeeze bulb arranged proximally of the draw tube and defining a fluid chamber in fluid communication with the lumen, the squeeze bulb being compressible to dispense drawn liquid from the draw tube;
    a volume indicating element comprising a radially outwardly projecting annular rib defined by a discrete rounded expansion of the lumen and being provided directly on the draw tube during formation of the capillary transfer pipette;
    an air vent hole extending through the volume indicating element and being provided during formation of the capillary transfer pipette, the air vent hole being configured to vent air therethrough to facilitate drawing of liquid through the draw tube opening via capillary action; and at least one fin extending longitudinally and having a distal end spaced proximally from the draw tube opening, wherein the distal end of the at least one fin is arranged so as to not extend distally beyond the air vent hole.

2. The capillary transfer pipette of claim 1, further comprising a plurality of volume indicating elements spaced along the draw tube.

3. The capillary transfer pipette of claim 1, wherein the capillary transfer pipette is formed from a polymeric material.

4. The capillary transfer pipette of claim 1, wherein the capillary transfer pipette is formed from a hydrophilic material.

5. The capillary transfer pipette of claim 1, wherein the lumen is formed with a first diameter at the proximal end and a differing second diameter at the distal end.

6. The capitally transfer pipette of claim 5, wherein a distal end portion of the lumen tapers radially inward in a direction toward the distal end.

7. The capitally transfer pipette of claim 5, wherein a distal end portion of the lumen flares radially outward in a direction toward the distal end.

8. A method of collecting liquid with a capillary transfer pipette having a draw tube, a volume indicating element provided directly on the draw tube during formation of the capillary transfer pipette, wherein the volume indicating element comprises a radially outwardly projecting annular rib defined by a discrete rounded expansion of the draw tube, an air vent hole extending through the volume indicating element and being provided during formation of the capillary transfer pipette, and at least one fin extending longitudinally and having a distal end, wherein the distal end of the at least one fin is arranged so as to not extend distally beyond the air vent hole, the method comprising:

positioning a distal opening of the draw tube in contact with a liquid to be drawn via capillary action;

drawing the liquid into the draw tube via capillary action; and selectively obstructing the air vent hole when a proximal surface of the drawn liquid reaches the volume indicating element so as to cease drawing of the liquid into the draw tube.

9. The method of claim 8, further comprising:

compressing a squeeze bulb of the capillary transfer pipette to dispense liquid from the draw tube.

10. A method of making a capillary transfer pipette, the method comprising:

extruding a parison of molten polymeric material;

positioning the parison within a mold cavity defined between first and second mold structures and having a cavity wall;

injecting air into the parison so that the parison expands within the mold cavity and conforms to the cavity wall to form a capillary transfer pipette, the mold cavity being shaped so as to provide the capillary transfer pipette with a draw tube having a lumen and configured to draw liquid via capillary action, a volume indicating element provided directly on the draw tube in response to the air being injected into the parison, the volume indicating element comprising an outwardly projecting annular rib defined by a discrete rounded expansion of the lumen, a squeeze bulb arranged proximally of the draw tube and configured to be compressed to dispense drawn liquid from the draw tube, and at least one fin extending longitudinally and having a distal end; and forming an open air vent hole in the volume indicating element during formation of the capillary transfer pipette, the air vent hole being configured to vent air therethrough to facilitate drawing of liquid by the draw tube via capillary action, wherein the distal end of the at least one fin is arranged so as to not extend distally beyond the air vent hole.

11. The method of claim 10, wherein forming the air vent hole includes piercing a wall of the parison while the parison is positioned within the mold cavity.

\* \* \* \* \*

UNITED STATES PATENT AND TRADEMARK OFFICE
CERTIFICATE OF CORRECTION

PATENT NO. : 10,814,320 B2
APPLICATION NO. : 15/231254
DATED : October 27, 2020
INVENTOR(S) : Le et al.

It is certified that error appears in the above-identified patent and that said Letters Patent is hereby corrected as shown below:

In the Specification

In Column 1, Line 48, change "At least volume indicating" to --At least one volume indicating--.

In Column 3, Line 9, change "FIG. 3B is schematic a side cross-sectional view similar" to --FIG. 3B is a schematic side cross-sectional view similar--.

In Column 5, Line 28, change "domed portion 24 of the squeeze bulb 20." to --domed portion 34 of the squeeze bulb 20.--.

In Column 17, Line 28, change "Referring to FIGS. 18A-180, the piercing" to --Referring to FIGS. 18A-18C, the piercing--.

In Column 17, Line 64, change "Referring to FIGS. 19A-190, details of the piercing" to --Referring to FIGS. 19A-19C, details of the piercing--.

In Column 17, Line 66, change "of the exemplary embodiment shown in FIGS. 19A-190 is" to --of the exemplary embodiment shown in FIGS. 19A-19C is--.

In the Claims

In Claim 6, Column 19, Line 18, change "The capitally transfer pipette of claim 5," to --The capillary transfer pipette of claim 5,--.

In Claim 7, Column 19, Line 21, change "The capitally transfer pipette of claim 5," to --The capillary transfer pipette of claim 5,--.

Signed and Sealed this
Fifth Day of January, 2021

Andrei Iancu
*Director of the United States Patent and Trademark Office*